(12) United States Patent
Kawasaki et al.

(10) Patent No.: US 7,746,670 B2
(45) Date of Patent: Jun. 29, 2010

(54) DUAL-TRANSFORMER TYPE OF DC-TO-DC CONVERTER

(75) Inventors: Koji Kawasaki, Anjo (JP); Tsuyoshi Yamashita, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 274 days.

(21) Appl. No.: 11/905,861

(22) Filed: Oct. 4, 2007

(65) Prior Publication Data
US 2008/0084714 A1    Apr. 10, 2008

(30) Foreign Application Priority Data
Oct. 4, 2006    (JP) .............................. 2006-273204

(51) Int. Cl.
*H02M 3/335* (2006.01)
(52) U.S. Cl. ...................................... 363/20
(58) Field of Classification Search .................. 363/16, 363/17, 20, 21.01, 22, 24, 49, 50
See application file for complete search history.

(56) References Cited

U.S. PATENT DOCUMENTS

| | | | | |
|---|---|---|---|---|
| 4,333,135 A | * | 6/1982 | Schwarz | 363/28 |
| 4,628,426 A | * | 12/1986 | Steigerwald | 363/17 |
| 5,291,382 A | * | 3/1994 | Cohen | 370/392 |
| 5,508,903 A | * | 4/1996 | Alexndrov | 363/16 |
| 5,771,163 A | * | 6/1998 | Moriguchi et al. | 363/71 |
| 6,324,080 B1 | * | 11/2001 | Laeuffer | 363/25 |
| 6,356,462 B1 | * | 3/2002 | Jang et al. | 363/17 |
| 7,130,203 B2 | * | 10/2006 | Mbaye | 363/56.12 |
| 7,254,046 B2 | * | 8/2007 | Kawasaki et al. | 363/21.12 |
| 2005/0047175 A1 | | 3/2005 | Kawasaki et al. | |
| 2008/0084714 A1 | * | 4/2008 | Kawasaki et al. | 363/21.01 |

FOREIGN PATENT DOCUMENTS

| | | |
|---|---|---|
| JP | 2003-102175 | 4/2003 |
| JP | 2005-51994 | 2/2005 |
| JP | 2005-51995 | 2/2005 |

* cited by examiner

*Primary Examiner*—Adolf Berhane
*Assistant Examiner*—Yemane Mehari
(74) *Attorney, Agent, or Firm*—Nixon & Vanderhye P.C.

(57) ABSTRACT

A first AC/DC converter circuit is coupled via two transformers to a second AC/DC converter circuit, the first AC/DC converter circuit having a symmetrical configuration of two switching elements performing complementary opened/closed switching, to alternately connect positive and negative terminals of a DC source to a junction between transformer primary windings. Each primary winding alternates between a condition of transferring electrical power to a secondary winding and a condition of serving as a choke coil which temporarily stores electromagnetic energy when a current flows through that primary winding and a primary winding of the other transformer.

21 Claims, 17 Drawing Sheets

DUAL-TRANSFORMER TYPE OF DC-TO-DC CONVERTER

CROSS-REFERENCE TO RELATED APPLICATIONS

This application is based on and incorporates herein by reference Japanese Patent Application No. 2006-273204 filed on Oct. 4, 2006.

BACKGROUND OF THE INVENTION

1. Field of Application

The present invention relates to a dual-transformer type of DC-to-DC converter, and in particular to an improved DC-to-DC converter providing high efficiency of conversion.

2. Description of Prior Art

Types of DC-to-DC converter which utilize two transformers have been proposed in the prior art, for example in Japanese patent application first publication No. 2003-102175 (referred to in the following as reference document 1), U.S. Pat. No. 5,291,382 (referred to in the following as reference document 2), Japanese patent application first publication No. 2005-51994 (referred to in the following as reference document 3), and Japanese patent application first publication No. 2005-51995 (referred to in the following as reference document 4). Reference documents 3 and 4 are each by the assignees of the present invention. In the DC-to-DC converters disclosed in each of reference documents 2, 3 and 4, during each interval in which electrical power is being outputted by the secondary side of a first one of the two transformers due to the transformer action of that transformer, the second transformer is storing magnetizing energy to enable a succeeding transformer action by that second transformer. During each interval in which power is being outputted from the secondary side of the second transformer, i.e., by the aforementioned succeeding transformer action, the first transformer is releasing magnetizing energy to enable a succeeding transformer action.

Due to the fact that primary windings of the two transformer are connected in series, the released manetizing energy of a first one of the transformers (i.e., manetizing energy stored in a primary windings of that transformer) is transferred to a primary winding of the second transformer, when electrical power is transferred to the secondary winding of the second transformer by transformer action from that primary winding of the second transformer. Thus due to the release of the stored manetizing energy, energy losses can be reduced. Due to the fact that the transformer actions of the two transformers (i.e., outputting of current to the secondary windings) and releasing of the magnetizing energy occur in successive alternation, the output currents from the respective secondary windings can be combined to obtain a substantially DC output current from the DC-to-DC converter.

Thus with each of the DC-to-DC converters of reference documents 2 to 4, the two transformer operate in alternation to produce an output voltage that is substantially a DC voltage, with only a small amount of ripple. In the case of the DC-to-DC converters of reference documents 2 and 3, a capacitor is used to transfer current between the primary windings and the primary-side power source, with charge storage by the capacitor serving to achieve a "soft switching" effect. The switching losses which occur in the primary-side switching elements (due to successive interruptions of the primary-side current) are thereby reduced so that a high efficiency of power transfer can be achieved.

Reduction of the losses that occur in a high-power type of electronic apparatus enables the cooling mechanism of that apparatus to be made smaller and more light in weight, and also enables the energy lost by performing cooling of the apparatus to be reduced. This is especially valuable in the case of an apparatus that is to be installed in a vehicle, since the available space for installing equipment is limited.

However with the DC-to-DC converters of reference documents 3 and 4, since high voltages are applied across the terminals of the switching elements in the high-voltage side of the apparatus, there is the disadvantage that it is necessary to use a plurality of expensive types of switching elements having a high breakdown voltage level. Furthermore, a switching element (more specifically, semiconductor device that is operated as a switching element) having a high breakdown voltage utilizes a relatively thick layer of low impurity-concentration material as a layer which withstands high voltages. As a result, the ON-state resistance of such a switching element is substantially greater than that of a switching element that is designed to only withstand low voltages. Hence, a switching element having a high breakdown voltage level has a high level of switching loss.

In general, there is a fixed limit on the maximum permissible level of loss for each semiconductor switching module (formed of one switching element or a plurality of switching elements connected in parallel). If switching elements having a high breakdown voltage level are utilized, then it becomes necessary to reduce the current density in each switching element, in view of the increased ON-state resistance of such a switching element. Thus in order to achieve a required level of current, it becomes necessary to connect a plurality of expensive switching elements (having a high breakdown voltage level) in parallel to constitute a switching module, instead of utilizing only a single switching element. Hence the manufacturing cost of the DC-to-DC converter becomes increased.

SUMMARY OF THE INVENTION

It is a purpose of the present invention to overcome the above problems, by providing a dual-transformer DC-to-DC converter in which requirements for the breakdown voltage level of switching elements in the converter can be substantially reduced by comparison with the prior art, and whereby increased efficiency of power transfer can be achieved.

To achieve the above purpose, the invention provides a two-transformer type of DC-to-DC converter comprising a first DC terminal and second DC terminal for respectively connecting the DC-to-DC converter to a low DC potential and to a high DC potential of a first external circuit, and a third DC terminal and fourth DC terminal for connecting the DC-to-DC converter to a second external circuit. The converter also comprises a first transformer having a first winding, a second winding and a third winding, and a second transformer having a fourth winding, a fifth winding and a sixth winding, with respective first ends of the first and fourth windings connected to form a first winding pair, respective first ends of the second and fifth windings connected to form a second winding pair, and respective second ends of the fourth and fifth windings connected together. A first AC/DC conversion circuit is connected between the first DC terminal and second DC terminal and the first winding, second winding, fourth winding and fifth winding, for performing power conversion between DC and AC electrical power. A second AC/DC conversion circuit is connected between the third and fourth DC terminals and the third and sixth windings, for performing conversion between DC and AC electrical power. Switching operations performed in the first and second AC/DC conversion circuits are controlled by a control circuit.

The converter is characterized in that the first AC/DC conversion circuit has a basically symmetrical configuration, comprising:

(a) a first switching element controlled for periodically connecting/disconnecting the first DC terminal to/from a junction (i.e., common connection point) of the second ends of the fourth and fifth windings, and a second switching element controlled for periodically connecting/disconnecting the second DC terminal to/from that junction, with these switching elements controlled to perform complementary opening/closing operations, (b) a first capacitor connected between the first DC terminal and the second end of the second winding, and (d) a second capacitor connected between the second DC terminal and the second end of the first winding.

Such a DC-to-DC converter provides similar advantages to those of the DC-to-DC converters disclosed in the above-described prior art patents of the assignees of the present invention (reference documents 3 and 4), including a reduced level of ripple in the output DC power, while providing the additional advantage of requiring a lower breakdown voltage level of the switching elements used in the first AC/DC conversion circuit. This is enabled due to the fact that lower levels of voltage are generated within the first AC/DC conversion circuit, with the present invention.

As a result of enabling the use of switching elements (e.g., FETs) having a lower breakdown voltage, semiconductor devices having a lower level of ON resistance (when the switching element is in the closed status) can be utilized, so that switching losses can be reduced without requiring to take measures such as connecting plural switching elements in parallel.

Furthermore, by comparison with the DC-to-DC converters of the above-described reference documents 3 and 4, the turns ratios of the transformers in the converter can be reduced, so that the manufacturing process can be simplified.

Moreover, due to the fact that the first AC/DC conversion circuit is configured to be substantially symmetrical, there is the further advantage of reduced effects of input common mode noise.

Furthermore, as an additional advantage incurred by the lowering of voltages developed internally within the first AC/DC conversion circuit, the breakdown voltage requirements for the capacitors utilized in that circuit can be lowered, thereby enabling capacitors of smaller size to be used, so that the overall size of the apparatus can be reduced.

To further achieve a lowering of the levels of voltage developed in the first AC/DC conversion circuit, at least one of the switching elements in that circuit is connected in parallel with a return current diode (i.e., a diode connected with polarity for conducting a reverse flow of current when the corresponding switching element is in the off-state). This serves to ensure that a surge voltage is not developed across the switching element when it is switched off. Hence, the breakdown voltage requirements for the switching elements of the first AC/DC conversion circuit can be reduced.

Furthermore, a "dead-time" interval is preferably established between the end of each interval in which one of the switching elements in the first AC/DC conversion circuit is in the closed state and the start of a succeeding interval in which the other switching element is set in the closed state, thereby ensuring that both of these switching elements cannot be concurrently in the switched-on state.

A DC-to-DC converter according to the present invention may be utilized to transfer power between a first DC power source that is connected between the first and second DC terminals and a second DC power source that is connected between the third and fourth DC terminals. In that case, if for example the converter is operated to make the voltage between the third and fourth DC terminals higher than the voltage produced by the second DC power source, then power will be transferred from the first DC power source to the second DC power source. For example if the second DC power source is a storage battery, then power for charging the battery will be transferred from the first DC power source. Conversely, if the converter is operated to render the voltage between the first and second DC terminals higher than the voltage produced by the first DC power source, then power will be transferred from the second DC power source to the first DC power source.

When power is to be transferred from the first and second DC terminals (i.e., as input terminals of the apparatus) to the second and third DC terminals (i.e., as output terminals of the apparatus), the first AC/DC conversion circuit is controlled to operate as a power inverter circuit, which converts DC power applied between to the first and second DC terminals into AC power that is transferred to the second AC/DC conversion circuit via the first and second transformers. In that case, the second AC/DC conversion circuit is operated as a rectifier circuit which converts the AC power to DC power, to be outputted from the third and fourth DC terminals.

The rectifier circuit preferably comprises a first rectifier element that is connected to rectify current produced from the third winding of the transformers and a second rectifier element that is connected to rectify current produced from the sixth winding. Since the required breakdown voltage of the first rectifier element is lower than that of the second rectifier element, it becomes possible for the first rectifier element to be a semiconductor device which has a lower amount of ON state resistance and having lower cost, than the second rectifier element.

It would be possible to utilize rectifier diodes as the first and second rectifier elements. However preferably, these are respectively implemented by third and fourth switching elements controlled to perform switching (opening/closing) in synchronism with the first and fourth switching elements, to thereby perform synchronous rectification.

In that case, in addition to achieving increased efficiency of DC-to-DC conversion, the resultant output DC power contains only a small amount of ripple, and hence it is only necessary to use a single capacitor connected across the output terminals to substantially eliminate any residual ripple, i.e., it becomes unnecessary to utilize a smoothing circuit containing a choke coil in conjunction with a smoothing capacitor. This further enables the overall size of the converter apparatus to be reduced, by comparison with the prior art.

With second and third switching elements utilized in the second AC/DC conversion circuit as described above, with a DC power source applied between the third and fourth DC terminals, the second AC/DC conversion circuit can be operated as a power inverter, which converts DC power applied between the third and fourth DC terminals to AC power that is transferred to the first AC/DC conversion circuit via the first and second transformers and second transformer, with the first AC/DC conversion circuit operating as a synchronous rectifier circuit to produce output DC power from the first and second DC terminals.

Furthermore, with a DC-to-DC converter according to the present invention, the control circuit is adapted to alternately set the first switching element in the closed and opened statuses with a predetermined duty ratio D, and to alternately set the second switching element in the closed and opened statuses with a duty ratio (1-D). The value of D is preferably set within a range whereby an amount of ripple in the output DC power (i.e., in the output DC current and/or voltage) of the DC converter is below a predetermined value.

Specifically, there is a substantially linear relationship between variation of the duty ratio D and the amount of ripple in the output DC power, with the theoretical value of the ripple becoming zero when D is 50%.

In addition, the level of output voltage of the converter varies in accordance with the value of D. Hence when the first and second external circuits are respective DC power sources, the direction of transfer of power between these can be changed in a simple manner, by adjusting the value of the duty ratio D. That is to say, if the value of D is made sufficiently low, the output DC voltage produced by the second AC/DC conversion circuit can be reduced below the source voltage of the second external circuit, so that power then begins to be transferred from the second external circuit to the first external circuit.

From another aspect, if the value of D is restricted to be no greater than 50%, then it is found that improved stability of operation of the converter can be achieved (i.e., reduced danger of parasitic oscillation) by comparison with utilizing values greater than 50%.

In particular, the ratio of leakage inductance to manetizing inductance, for each of the first and second transformers, is preferably held at a value whereby the amount of ripple in the output DC power becomes substantially zero when the duty ratio D is a predetermined value that is no greater than 50%. In that way it can be ensured that there is a minimized danger of instability of operation when the converter is operating with a level of output current that is within a normally-utilized range of output current values.

Furthermore, there is generally a predetermined specific range of allowable variation of the output voltage from a DC-to-DC converter. With the converter of the present invention, the output voltage becomes zero when the duty ratio D is 0%, and is a maximum when D is 50%. Thus, a range of allowable values of D can be established (corresponding to a range of allowable values of output voltage from the converter) so that it is possible for the converter to be configured for enabling the output voltage to be adjusted within the allowable range, by altering the value of D.

Alternatively, the converter can be configured for automatic feedback control of the output DC voltage, by utilizing a control circuit which compares the output DC voltage with a target voltage, and determines the duty ratio D in accordance with the amount of deviation of the output DC voltage, to thereby maintain the output DC voltage at the target value.

DESCRIPTION OF PREFERRED EMBODIMENTS

Figure 1:
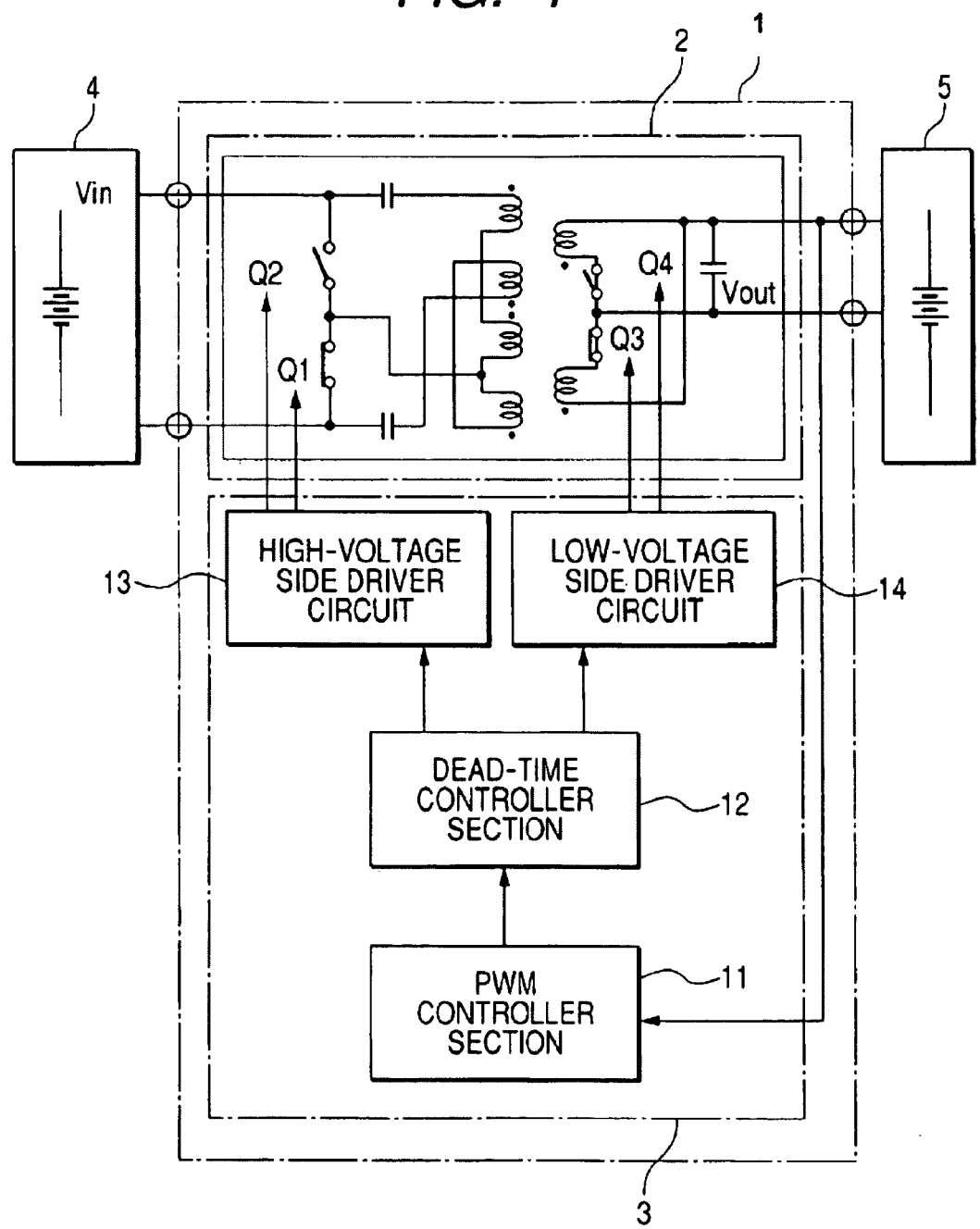
FIG. 1 is an overall circuit block diagram of an embodiment of a 2-transformer DC-to-DC converter.

Embodiments of the invention will be described in the following referring to the drawings. However it should be noted that the invention is not limited to these embodiments, and that various alternative configurations or modifications of the embodiments could be envisaged, which fall within the scope claimed for the invention.

Overall Configuration

FIG. 1 is a circuit block diagram showing the overall configuration of an embodiment of a DC-to-DC converter, designated by reference numeral 1. The DC-to-DC converter 1 is connected to transfer DC electrical power between a high-voltage power source 4 and a low-voltage power source 5 and is capable of transferring power bidirectionally. However the apparatus is described in the following for the case in which power is transferred from the high-voltage power source 4 to the low-voltage power source 5 (more specifically, to a combination of the low-voltage power source 5 and an electrical load, as described hereinafter) with the output voltage of the high-voltage power source 4 designated as Vin and the output voltage of the power section 2 (applied to the low-voltage power source 5) designated as Vout. The low-voltage power source 5 may be for example a 12 V storage battery, and when the output voltage Vout applied from the power section 2 to the low-voltage power source 5 exceeds the EMF being generated by the low-voltage power source 5, current flows from the power section 2 into the low-voltage power source 5 (more specifically, into the low-voltage power source 5 and into an electrical load that is connected in parallel with that power source).

Each of the switching elements is assumed to be a FET (field-effect transistor), which is, set in the ON (conducting) or OFF (non-conducting) state between its main terminals (i.e., source, drain electrodes) in accordance with a corresponding gate drive voltage being set at the high (active) or low (inactive) level.

The control section 3 includes a PWM controller section 11, a dead-time controller section 12, a high-voltage side driver circuit 13 and a low-voltage side driver circuit 14. The PWM controller section 11 serves to determine a duty ratio with which switching is performed in the power section 2, with the duty ratio being determined in accordance with a deviation of the output voltage of the power section 2 from a predetermined target value. The PWM controller section 11 also generates PWM control signals S1 and S2 (described hereinafter) at a predetermined carrier frequency. The PWM control signal S1 is a pulse signal for controlling a switching element Q1 (described hereinafter) in the power section 2, and has a duty ratio D (determined by the PWM controller section 11). The PWM control signal S2 is a pulse signal for controlling a switching element Q2 (described hereinafter) in the power section 2, and has a duty ratio of (1-D), i.e., the PWM control signals S1, S2 have a complementary phase relationship.

The dead-time controller section 12, which generates the PWM control signals S1 and S2 with the respective duty ratios determined by the PWM controller section 11, is a known type of circuit which determines "dead-time" intervals in which both of the S1 and S2 are set OFF as described hereinafter. The high-voltage side driver circuit 13 is a known type of driver circuit which amplifies the PWM control signals S1, S2 that are outputted from the dead-time controller section 12, and supplies the amplified signals as respective gate drive voltages to the high-voltage side switching elements Q1, Q2 in the power section 2. With this embodiment, the high-voltage side driver circuit 13 is an input/output isolated type of driver circuit. The reference low-potential level of the output voltages from the high-voltage side driver circuit 13 is preferably the negative-polarity potential of the high-voltage power source 4.

The low-voltage side driver circuit 14 is a known type of driver circuit which amplifies the PWM control signals S1, S2 that are outputted from the dead-time controller section 12, and supplies the amplified signals as respective gate drive voltages to the low-voltage side switching elements Q3, Q4 (described hereinafter) in the power section 2. It is possible to utilize an input/output isolated type of amplifier circuit as the low-voltage side driver circuit 14, however an input/output non-isolated type of amplifier circuit can be utilized as the low-voltage side driver circuit 14 if the reference low-potential level of the output voltage from the low-voltage side driver circuit 14 is made the negative-polarity potential of the low-voltage power source 5.

This embodiment will be described for the case in which DC power is being transferred from the high-voltage power source 4 to the low-voltage power source 5. i.e., with the duty ratio D set at a value whereby the voltage Vout is higher than a voltage generated by the low-voltage power source 5 (i.e., the battery EMF, when the power source 5 is a storage battery). As indicated in FIG. 1, the output voltage Vout is supplied to the PWM controller section 11 of the control section 3. The PWM controller section 11 is configured to adjust the duty ratios D and (1-D) of switching performed by the switching elements of the power section 2, in accordance with a deviation of the output voltage Vout of the power section 2 from a predetermined target voltage. As described hereinafter, the level of the output voltage Vout varies in accordance with the value of the duty ratio D, and hence feedback control of the level of output voltage Vout can be performed by the control section 3, to hold the output voltage Vout at the target value.

It is equally possible to operate the converter for transferring power in the opposite direction, from the low-voltage power source 5 to the high-voltage power source 4, by setting the value of the duty ratio D such that the output voltage Vout of the power section 2 becomes lower than the voltage generated by the low-voltage power source 5.

It should also be noted that instead of the PWM controller section 11 controlling the value of the duty ratio D in accordance with the level of output voltage Vout of the power section 2, it would be equally possible for the PWM controller section 11 to monitor the level of current that flows between the power section 2 and low-voltage power source 5, and to control the duty ratio D in accordance with that current level.

The DC-to-DC converter 1 of this embodiment is essentially similar to a prior art type of DC-to-DC converter, other than for the configuration of the power section 2 and the above-described feature of feedback control of the output voltage Vout. Hence only the power section 2 will be described in detail in the following.

Configuration of Power Section 2

Figure 2:
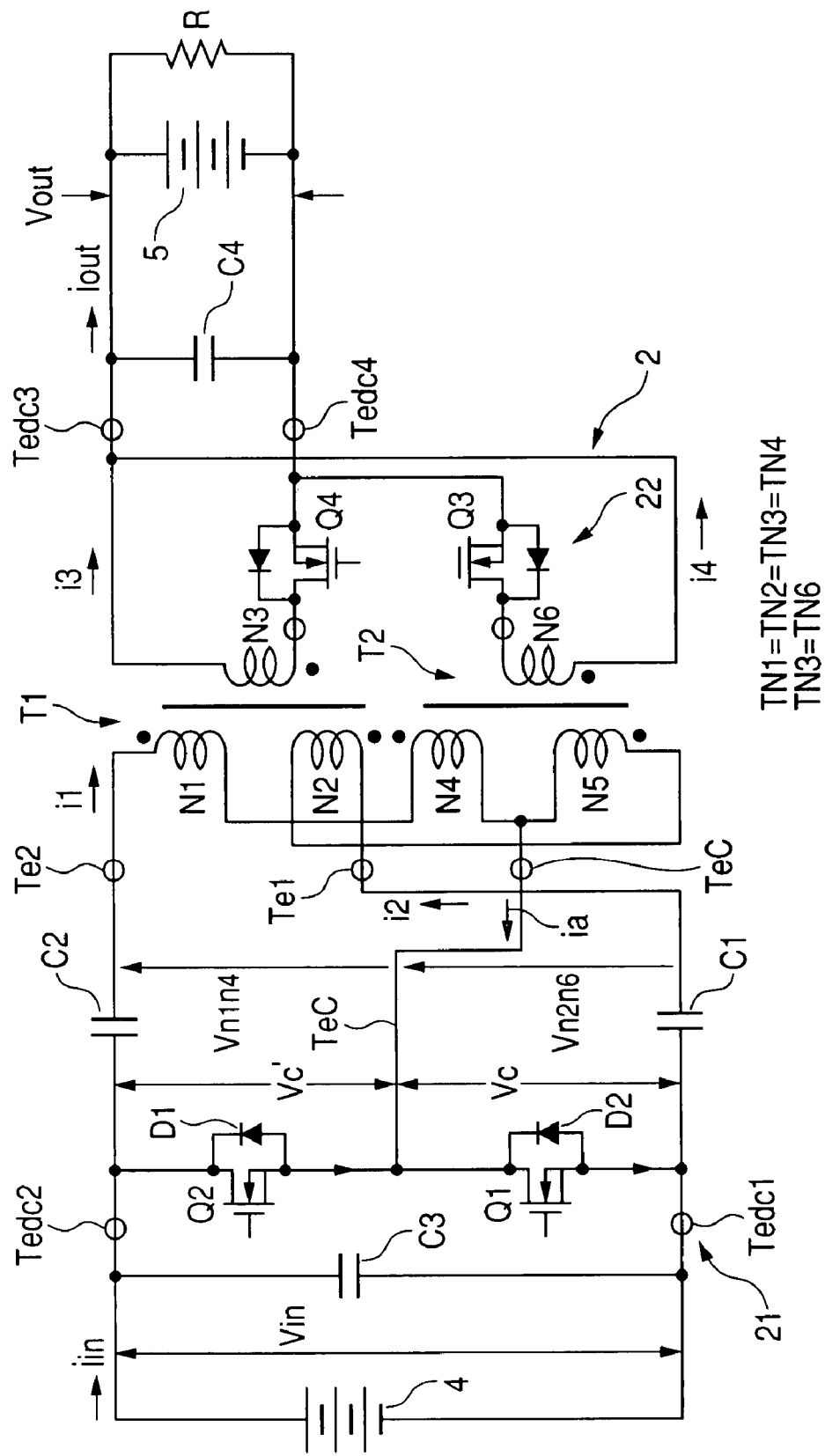
FIG. 2 shows the circuit configuration of a power conversion section of the embodiment.

FIG. 2 is a circuit diagram of the power section 2, with directions of current flow being indicated for the case in which power is transferred from the high-voltage power source 4 to the low-voltage power source 5 (i.e., as a charging current, when the low-voltage power source 5 is a storage battery) and to an electrical load R that is connected in parallel with the low-voltage power source 5. Assuming that the low-voltage power source 5 is a 12 V storage battery of a vehicle, the electrical load R is constituted by various electrical equipment of the vehicle, such as the headlamps, etc.

As shown, the power section 2 is made up of the actual DC-to-DC converter (formed of a pair of transformers T1, T2, switching elements Q1, Q2, capacitors C1, C2, and switching elements Q3, Q4), a high-voltage side smoothing capacitor C3 and a low-voltage side smoothing capacitor C4.

With this embodiment, the switching elements Q1 to Q4 are respective FETs (field-effect transistors) as indicated in FIG. 2, with each switching element having an intrinsic parasitic diode between its main (i.e., source, drain) terminals. The parasitic diodes of the switching elements Q1, Q2 are respectively designated as D1 and D2.

The pair of transformers T1, T2 is made up of a transformer T1 having primary windings N1, N2 and a secondary winding N3, and a transformer T2 having primary windings N4, N5 and a secondary winding N6. The windings N1 and N4 are connected in series, with respective first ends of these windings connected together, and will be collectively referred to as the No. 1 winding pair. Similarly the windings N2 and N5 are connected in series and will be collectively referred to as the No. 2 winding pair. The second end of the winding N2 will be designated as the independent terminal Te1 of the No. 2 winding pair, while the second end of the winding N1 will be designated as the independent terminal Te2 of the No. 1 winding pair. The respective second ends of the windings N4, N5 are connected together, with the junction of these second ends being designated as the common terminal Tec.

The terminals which are respectively connected to the negative-polarity and positive-polarity sides of the high-voltage power source 4, to receive the output voltage Vin of that power source, are designated as the No. 1-side DC terminals Tedc1, Tedc2. The circuit connected between Tedc1, Tedc2 (made up of the switching elements Q1, Q2, the capacitors C1, C2 and the windings N1, N2, N4, N5) is designated as the No. 1 AC/DC conversion circuit. The No. 1 AC/DC conversion circuit 21 functions as a power inverter circuit (performing DC-to-AC conversion) when power is being transferred from the high-voltage power source 4 to the low-voltage power source 5. When power is being transferred from the low-voltage power source 5 to the high-voltage power source 4, the No. 1 AC/DC conversion circuit 21 operates as a synchronous rectifier circuit.

The terminals Tedc3 and Tedc4 which are connected to the low-voltage power source 5, and to which the aforementioned voltage Vout is applied, are designated as the No. 2-side DC terminals Tedc3, Tedc4. The circuit connected between Tedc3, Tedc4 (made up of the switching elements Q3, Q4, and the windings N3, N6) is designated as the No. 2 AC/DC conversion circuit 22. The No. 2 AC/DC conversion circuit 22 functions as a synchronous rectifier circuit when electrical power is being transferred from the high-voltage power source 4 to the low-voltage power source 5. When power is being transferred from the low-voltage power source 5 to the high-voltage power source 4, the No. 2 AC/DC conversion circuit 22 operates as a power inverter circuit.

With this embodiment, as indicated in FIG. 2, the windings N1, N2, N3, N4 have respectively identical numbers of turns, while similarly the windings N3, N6 have respectively identical numbers of turns.

In the No. 1 AC/DC conversion circuit 21, the switching element Q1 is connected between the common terminal Tec and the DC terminal Tedc1 (with the DC terminal Tedc1 being connected to the negative-polarity side of the output voltage from the high-voltage power source 4) and is repetitively switched on and off with a predetermined repetition period, and the switching elements Q1, Q2 are controlled to perform complementary on/off switching. The switching element Q1 is connected between the common terminal Tec and the DC terminal Tedc2 (which is connected to the positive-polarity side of the output voltage from the high-voltage power source 4). The capacitor C1 is connected between the DC terminal Tedc1 and the independent terminal Te1, while the capacitor C2 is connected between the DC terminal Tedc2 and the independent terminal Te2.

In the No. 2 AC/DC conversion circuit 22, the switching element Q3 is connected between a first end of the winding N6 and the DC terminal Tedc4, while the second end of the winding N6 is connected to the DC terminal Tedc3. A first end of the winding N3 is connected to the DC terminal Tedc3, while the switching element Q4 is connected between the second end of the winding N3 and the DC terminal Tedc4. The switching elements Q3, Q4 are controlled to perform complementary on/off switching in synchronism with the switching of the switching elements Q1, Q2.

It should be noted that it would be possible to replace the switching element Q3 and switching element Q4 by respective rectifier diodes, if power transfer is to be performed only unidirectionally, from the high-voltage power source 4 to the low-voltage power source 5.

The high-voltage side smoothing capacitor C3 is connected across the No. 1-side DC terminals Tedc1, Tedc2 as shown, while the low-voltage side smoothing capacitor C4 is similarly connected across the No. 2-side DC terminals Tedc3, Tedc4. The aforementioned electrical load R is connected between the terminals of the low-voltage power source 5.

Figure 3:
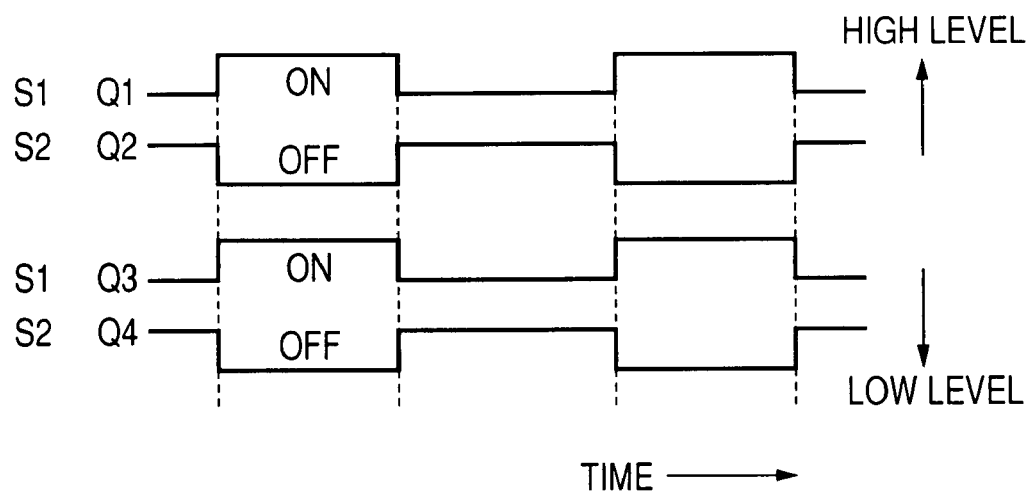
FIG. 3 is a timing diagram showing idealized switching waveforms, for illustrating operation timings of switching elements in the embodiment.

The switching timings of the switching elements Q1 to Q4 are illustrated in idealized form in the timing diagram of FIG. 3, which does not show the aforementioned "dead-time" intervals.

Operation of Power Section 2

Figure 4:
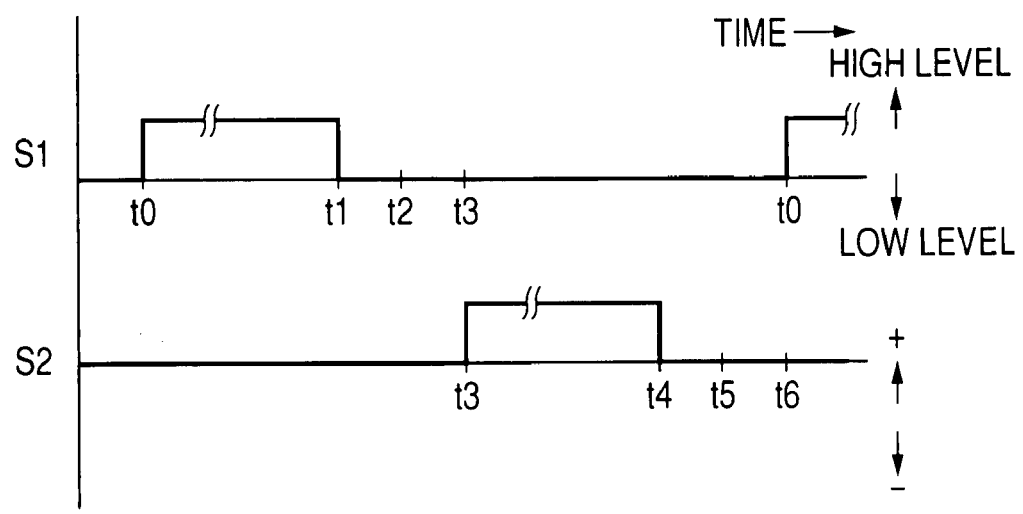
FIG. 4 is a timing diagram showing actual operation timings of the switching elements, indicating respective time intervals within a cyclically repeated switching sequence.
Figure 5:
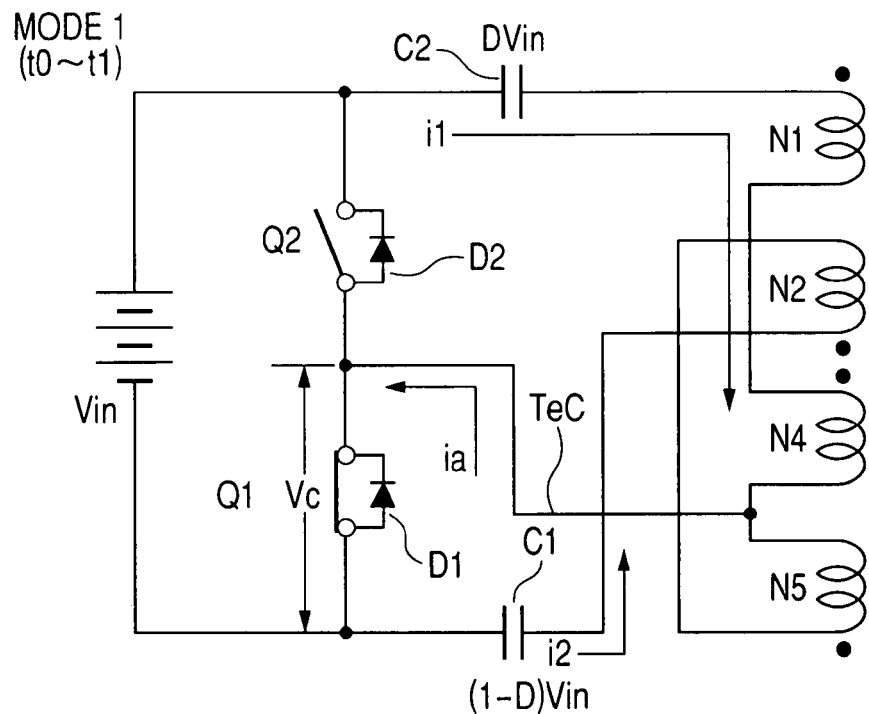
FIG. 5 is a circuit diagram illustrating currents which flows in the power conversion section of the embodiment, during Mode 1 operation (first time interval shown in FIG. 4)
Figure 6:
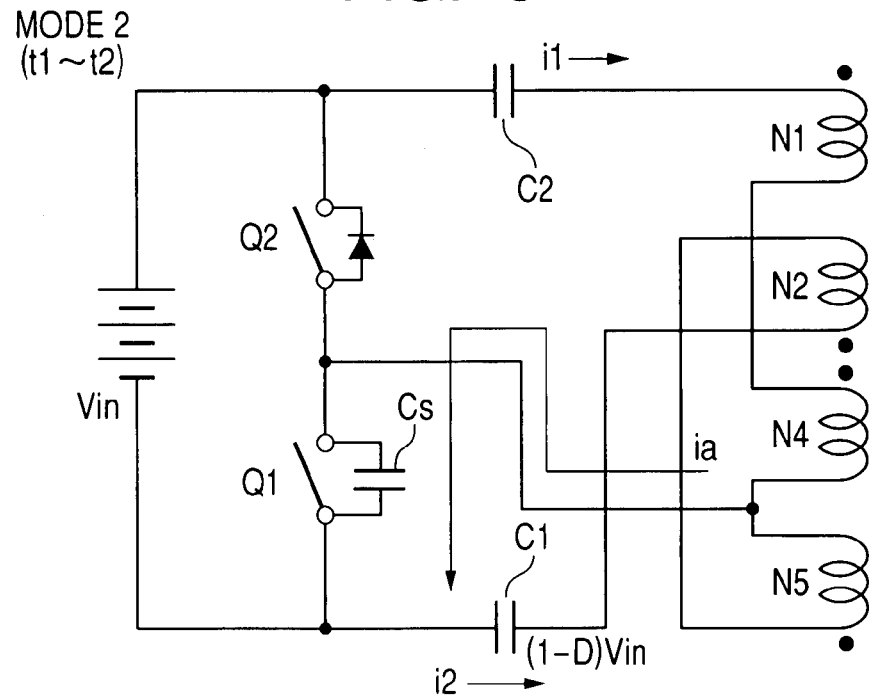
FIG. 6 is a circuit diagram illustrating currents which flows in the power conversion section during Mode 2 operation (second time interval shown in FIG. 4)
Figure 7:
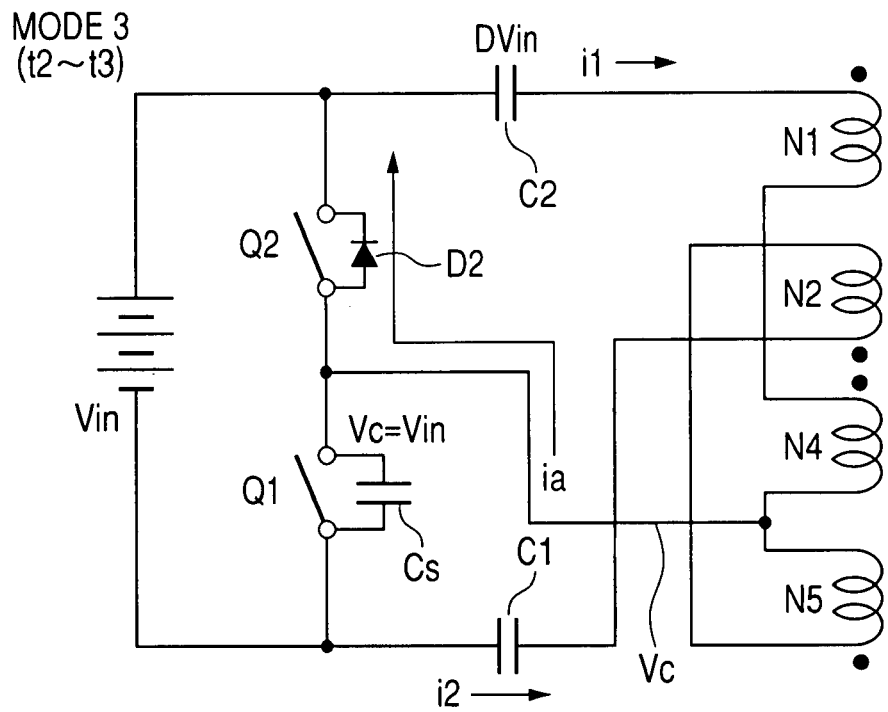
FIG. 7 is a circuit diagram illustrating currents which flows in the power conversion section during Mode 3 operation (third time interval shown in FIG. 4)
Figure 8:
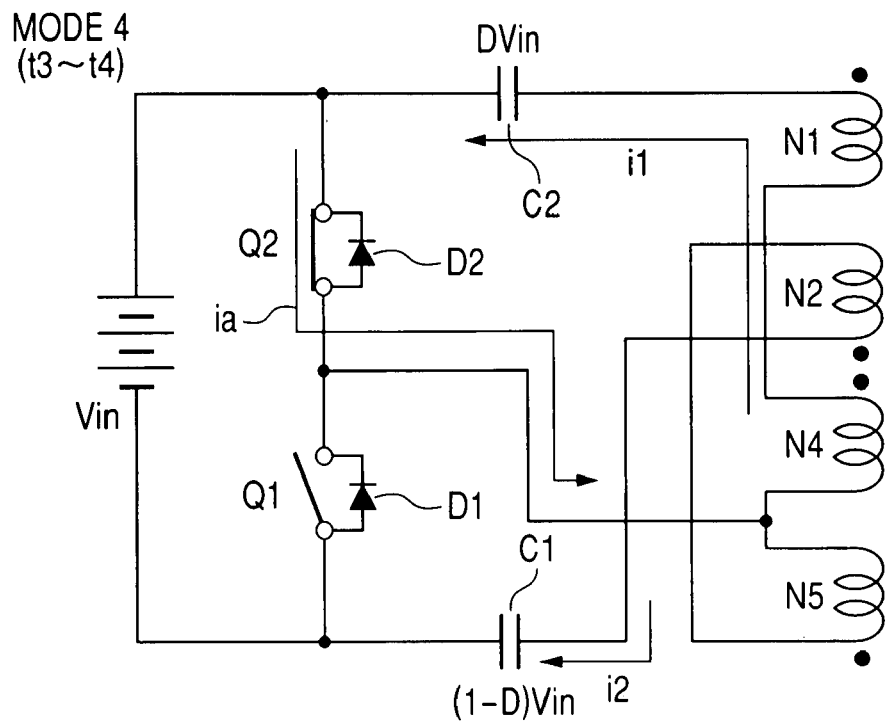
FIG. 8 is a circuit diagram illustrating currents which flows in the power conversion section during Mode 4 operation (fourth time interval shown in FIG. 4)
Figure 9:
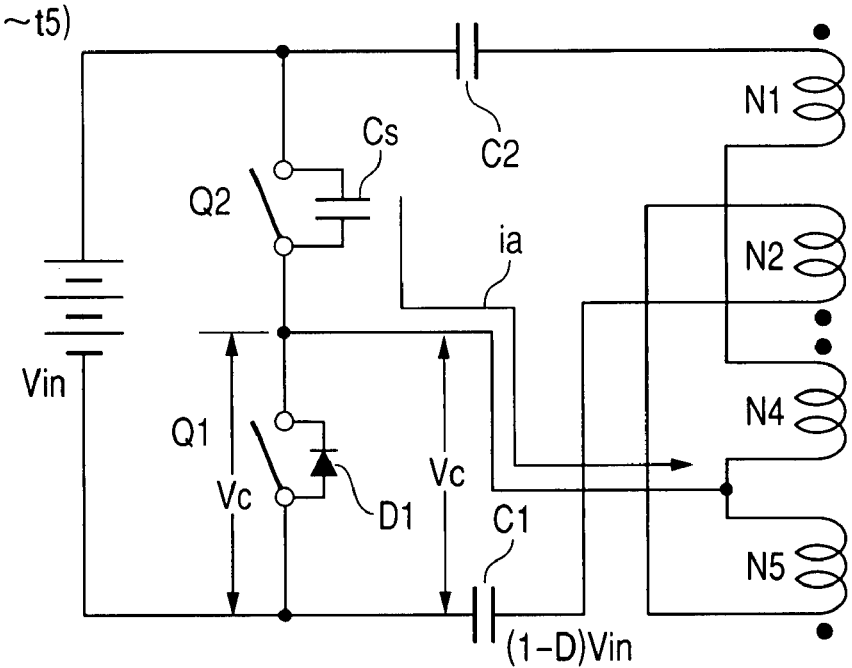
FIG. 9 is a circuit diagram illustrating currents which flows in the power conversion section during Mode 5 operation (fifth time interval shown in FIG. 4)
Figure 10:
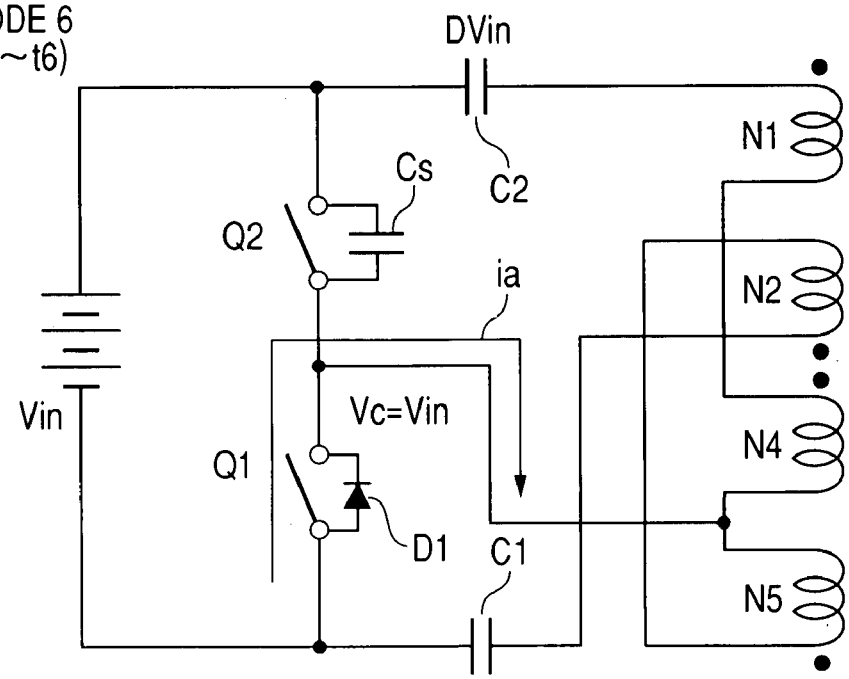
FIG. 10 is a circuit diagram illustrating currents which flows in the power conversion section during Mode 6 operation (sixth time interval shown in FIG. 4)

The operation of the power section 2 will be described referring to FIGS. 4 to 10. FIG. 4 is a timing diagram illustrating actual switching timings of the switching elements Q1 to Q4. FIG. 5 is a circuit diagram for indicating currents which flow in the AC/DC conversion circuit 21 during each interval from t0 to t1 shown in FIG. 4, with operation during such an interval being referred to in the following as mode 1. FIG. 6 is a circuit diagram which similarly indicates currents that flow during each interval from t1 to t2, with that operation referred to as mode 2. FIG. 7 is a circuit diagram which similarly indicates currents that flow during each interval from t2 to t3, with that operation referred to as mode 3. FIG. 8 is a circuit diagram which similarly indicates currents that flow during each interval from t3 to t4, with that operation referred to as mode 4. FIG. 9 is a circuit diagram which similarly indicates currents which flow during each interval from t4 to t5, with that operation referred to as mode 5. FIG. 10 is a circuit diagram which similarly indicates currents which flow during each interval from t5 to t6, with that operation referred to as mode 6.

The AC/DC conversion circuit 22 is operated as a synchronous rectifier circuit when power is transferred from the high-voltage power source 4 to the low-voltage power source 5. To achieve this, the switching element Q3 is switched on in synchronism with the switching element Q1, while the switching element Q4 is switched on in synchronism with the switching element Q2. Since such a form of circuit operation is well known (as are also the functions of the smoothing capacitors C3 and C4) detailed description of these is omitted.

Specific features of the operation of the AC/DC conversion circuit 21 are described in the following, assuming that power is transferred from the high-voltage power source 4 to the low-voltage power source 5, i.e., with the AC/DC conversion circuit 21 operating as a power inverter circuit and the AC/DC conversion circuit 22 operating as a synchronous rectifier circuit. In that condition, since the switching elements Q3, Q4 perform complementary switching as described above, each of the transformers T1, T2 successively alternates between a condition of functioning as a transformer and as a choke coil (i.e., reactor). That is to say, during each interval in which the switching element Q1 is in the ON state, the transformer T1 functions as an inductor element and the transformer T2 functions as a transformer. Moreover, in addition to transformer action between the primary and secondary sides of the transistor T2 during such an interval, transformer action also occurs between the windings N1 and N2 of the transformer T1. Similarly, during each interval in which the switching element Q2 is in the ON state, the transformer T2 functions as an inductor element and the transformer T1 functions as a transformer. In that case, transformer action also occurs between the windings N4 and N5 of the transformer T1 during such an interval.

During each interval of choke coil operation of one of the transformers T1 and T2, magnetic flux that has been generated in the windings of that transformer during an immediately preceding interval of transformer operation becomes dissipated. Specifically, the manetizing energy stored in that transformer is dissipated as current that flows in the secondary windings of the other transformer and as current that charges the capacitors C1 and C2 of the AC/DC conversion circuit 21, while some energy is regenerated as current that flows to the high-voltage power source 4.

It is convenient to consider the currents that flow in the AC/DC conversion circuit 21 as being a current i1 which flows from the independent terminal Te2 into the transformer pair T1, T2, a current i2 which flows from the independent terminal Te1 into the transformer pair T1, T2, and a current ia which is the sum of i1 and i2 and which flows out of the transformer pair T1, T2 and through the common terminal Tec. The directions of these currents are of course successively inverted from the directions shown in FIG. 2. Each of these currents is the sum of an excitation current component and a component that has been induced electromagnetically. The voltage between any pair of the set of terminals {independent terminal Te1, independent terminal Te2, common terminal Tec} can be considered (in the ideal case) to be the sum of the respective voltage drops across the inductances between that pair of terminals.

The current i1 is supplied through the capacitor C2 and the current i2 is supplied through the capacitor C1. Each of the currents i1, i2 successively decreases to zero, with the voltage across the corresponding capacitor (C1 or C2) changing accordingly, i.e., proportional to the integral of the current flow, so that the voltages at each of the terminals Te1, Te2 successively fall until the corresponding current (i2, i1) has reached zero. The current ia (=i1+i2) thereby falls to zero. The current ia flows through either the switching element Q1 or the switching element Q2, i.e., the one of these switching elements that is currently in the ON state. If the current ia has fallen to zero (or substantially zero) at the time point when that switching element is changed to the OFF state, then switching losses can be significantly reduced, i.e., a "soft switching" effect is achieved. This effect is achieved with the present invention, as described hereinafter.

The operating conditions of the switching elements Q1 and Q2 in each of the above-described modes is described in the following.

Mode 1

In mode 1, currents flow as illustrated in FIG. 5. In this mode, the switching elements Q2 and Q4 are in the OFF state while the switching elements Q1 and Q3 are ON. With the switching element Q2 in the OFF state, if the switching element Q1 is switched on at the time point to, then the current ia that flows from the common terminal Tec will increase linearly. In this mode, the current ia is the sum of the current i1 that flows from the high-voltage power source 4 through the windings N1, N4 and the switching element Q1 to return to the high-voltage power source 4, and so charges the capacitor C2, and the current i2 that flows as a discharge current from the capacitor C1 through the windings N2, N5 and the switching element Q1 to return to the capacitor C1.

Since the switching element Q4 is in the OFF state, the windings N1 and N2 of the transformer T1 function as an inductance element (choke coil) and so store manetizing energy. Since the switching element Q3 is ON, the transformer T2 performs transformer operation so that a secondary current i4 flows out from the winding N6, with the level of that current being proportional to the sum of the currents i1, i2 that flow in the windings N4, N5. As described above, in this condition the current i1 charges the capacitor C2 while the current i2 discharges the capacitor C1.

Mode 2

In mode 2, currents flow as illustrated in FIG. 6. In this mode, the switching elements Q2 and Q4 are in the OFF state while the switching elements Q1 and Q3 are also OFF. When the switching element Q1 is switched off at time point t1, the electrical energy resulting from the magnetizing energy stored in the windings of the transformer pair T1, T2 flows as the current ia (=i1+i2) to charge the junction capacitance Cs of the switching element Q1. As a result, the voltage Vc across the switching element Q1 increases (i.e., becomes more positive with respect to the negative-polarity side of Vin).

Mode 3

Next, in mode 3, the flow of currents until the switching element Q2 becomes set ON is illustrated in FIG. 7. As the junction capacitance Cs and stray capacitance of the switching element Q1 become charged, when the voltage Vc of the common terminal Tec increases above the input voltage Vin by an amount exceeding the forward voltage of the parasitic diode D2 of the switching element Q2 (at time point t2), the current ia flows from the common terminal Tec to the high-voltage power source 4 (through the parasitic diode D2) as magnetizing energy of the transformer T1 is dissipated. The voltage Vc thus becomes clamped at the input voltage Vin. More precisely, Vc is clamped at a value that is higher (more positive) than Vin by an amount equal to the forward voltage of the parasitic diode D2.

Thereafter, as the magnetizing energy of the transformer T1 is dissipated, the current ia successively decreases accordingly.

Since the voltage Vc is applied across the switching element Q1, the voltage Vc' that is applied across the switching element Q2 has the value (Vin−Vc).

It should be noted that it would be equally possible to connect a separate diode across the switching element Q2, to perform the function described for the parasitic diode D2.

Subsequently, dissipation of the magnetizing energy stored in the transformer T1 continues, with charging of the capacitor C2 and discharging of the capacitor C1 thereby continuing, and with the current ia decreasing linearly and becoming zero at the time point t3 shown in FIG. 4.

Mode 4

In mode 4, currents flow as illustrated in FIG. 8. With this embodiment, the switching element Q2 is set in the ON state at time point t3, however it would be equally possible for the switching element Q2 to be turned ON at a time point close to t3 which is determined by a circuit time constant. That is to say, with this embodiment the switching element Q2 is set ON at the time point t3 when the current ia becomes zero, however it would be equally possible to set the switching element Q2 ON at an earlier time point, during the mode 3 interval, or after completion of the mode 3 interval at time point t3. In the former case, it is preferable (to reduce switching loss) that the switching element Q2 be turned ON at a point as close as possible to the time point t3. In the latter case, in which Q2 is set to the ON state only after the current ia has reached zero at time point t3, the switching loss will be zero.

In mode 4, the switching elements Q1 and Q3 are OFF. While the switching elements Q2 and Q4 are both ON. Referring to FIG. 8, when the switching element Q2 is switched from the OFF to the ON state at time point t3, the level of current ia which flows through the common terminal Tec in the AC/DC conversion circuit 21 reverses in direction, and begins to increase linearly. In this case the current ia is the sum of:

(a) the current i2 which flows from the high-voltage power source 4 through the switching element Q2, the windings N5 and N2 and the capacitor C1, to return to the high-voltage power source 4, and which thereby charges the capacitor C1, and (b) the current i1 which flows from the capacitor C2 through the switching element Q2 and the windings N4 and N1, to return to the capacitor C2, and which thereby discharges the capacitor C2.

As a result of the switching element Q3 being in the OFF state at this time, the windings N4, N5 of the transformer T2 function as an induction element (choke coil), and due to the switching element Q4 being ON, the transformer T1 functions as a normal transformer so that a secondary current i3 flows in the winding N3 as an output current, in response to the currents i1, i2 that flow in the primary windings N1, N2 of the transformer T1. The current i1 discharges the capacitor C2 and the current i2 charges the capacitor C1. As a result, magnetizing energy becomes stored in the transformer T2, whose windings are functioning as a choke coil.

Mode 5

In mode 5, currents flow as illustrated in FIG. 9. In this mode, the switching elements Q2 and Q4 are in the OFF state while the switching elements Q1 and Q3 are also OFF. When the switching element Q2 is turned OFF at time point t4, the electrical energy produced by the dissipation of magnetizing energy stored in the transformer pair T1, T2 flows as the current ia (i1+i2), thereby charging the junction capacitance Cs of the switching element Q2. As a result, the voltage Vc across the switching element Q1 becomes reduced, and the voltage Vc' across the switching element Q2 becomes increased.

Mode 6

The currents which flow in mode 6, until the switching element Q1 becomes set in the ON state, will be described referring to FIG. 10. At time point t5 the voltage Vc again becomes lowered. When Vc becomes lower than (more negative than) the negative-polarity side of the high-voltage power source 4 by a small amount (sufficient to exceed the forward voltage of the parasitic diode D1 of the switching element Q1), the diode D1 becomes conducting. The current ia thereby begins to flow from the negative-polarity terminal of the high-voltage power source 4 into the common terminal Tec, and the voltage Vc becomes clamped at substantially 0 V.

In the same way as for the diode D2, it would be equally possible to utilize a separate diode to perform the above function of the parasitic diode D1.

Thereafter, this operation continues until the time point t6 (i.e., =t0), whereupon the above sequence is repeated.

Voltage and Current Waveforms

Figure 11:
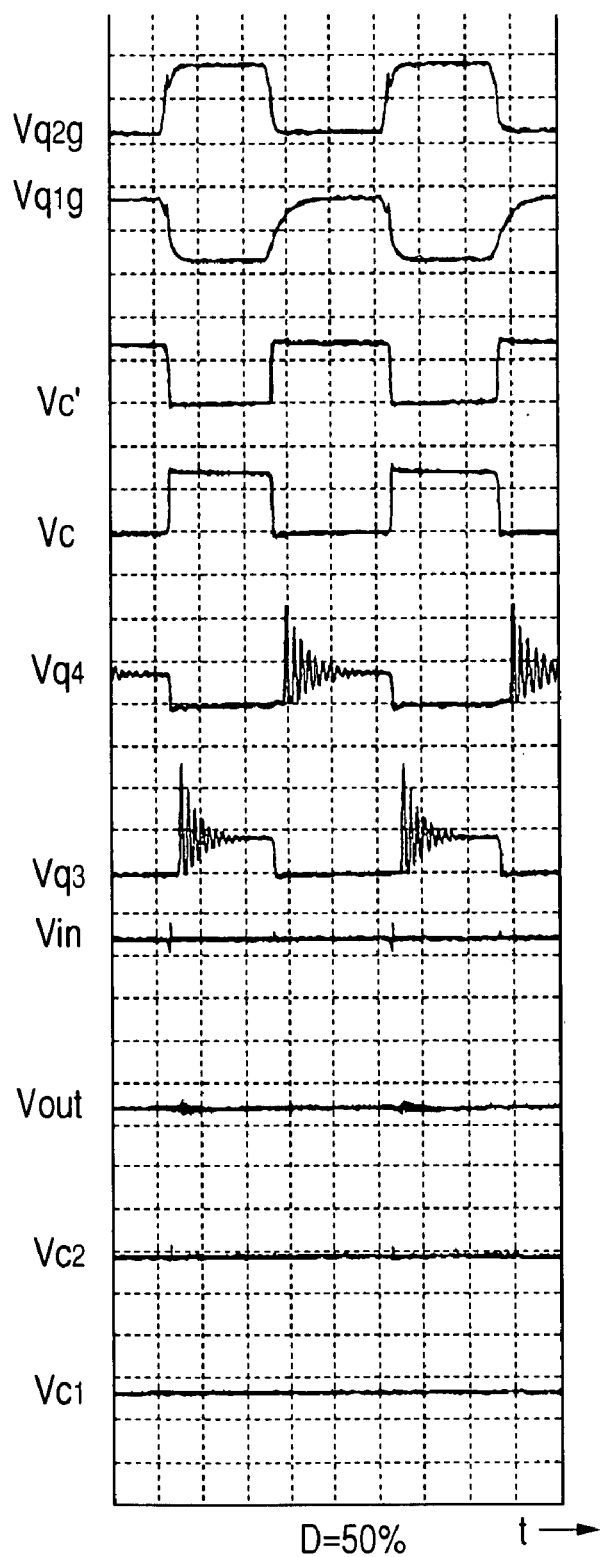
FIG. 11 is a timing diagram showing measured examples of voltage waveforms appearing at respective locations in the embodiment, for the case of operation with a duty ratio D equal to 50%.
Figure 12:
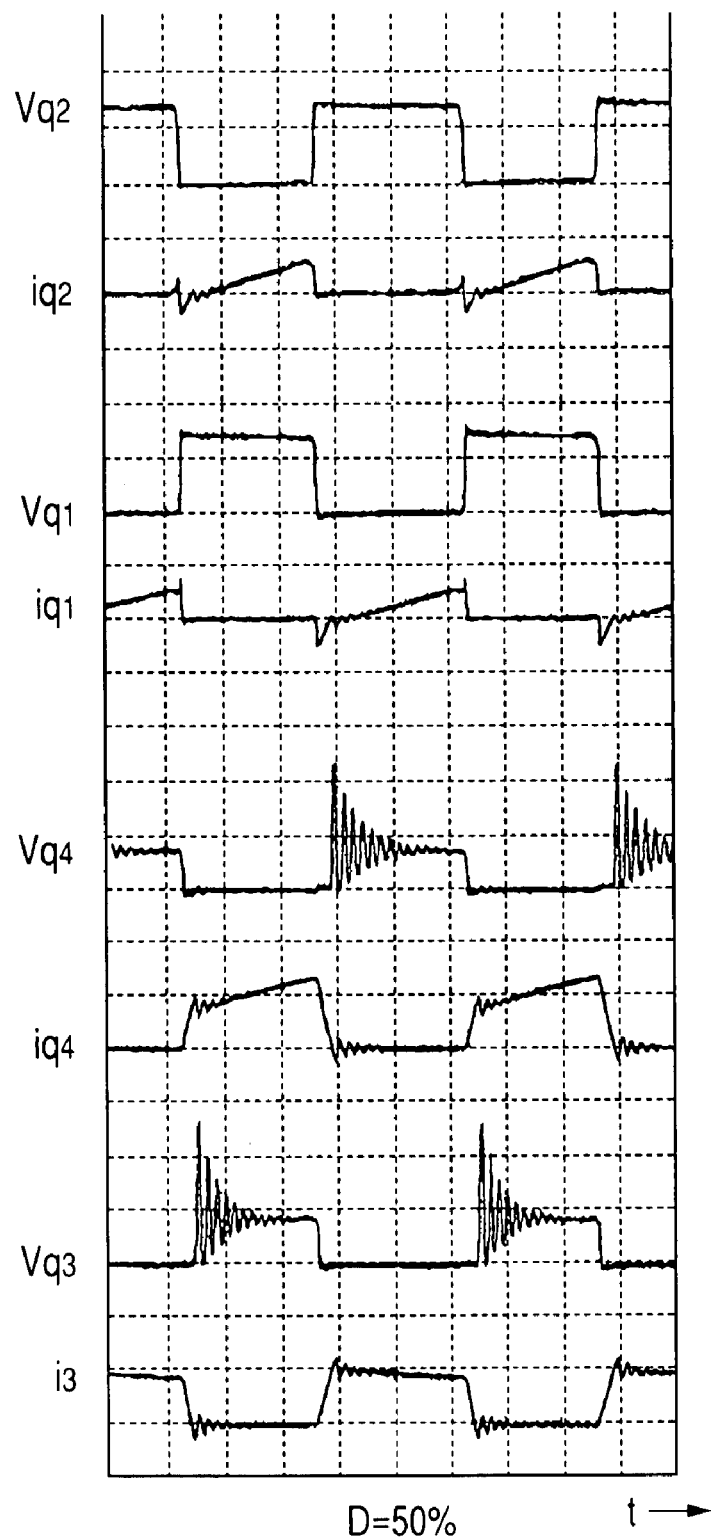
FIG. 12 is a timing diagram showing measured examples of voltage and current waveforms respectively appearing at a second set of locations in the embodiment, for the case of operation with a duty ratio D equal to 50%.
Figure 13:
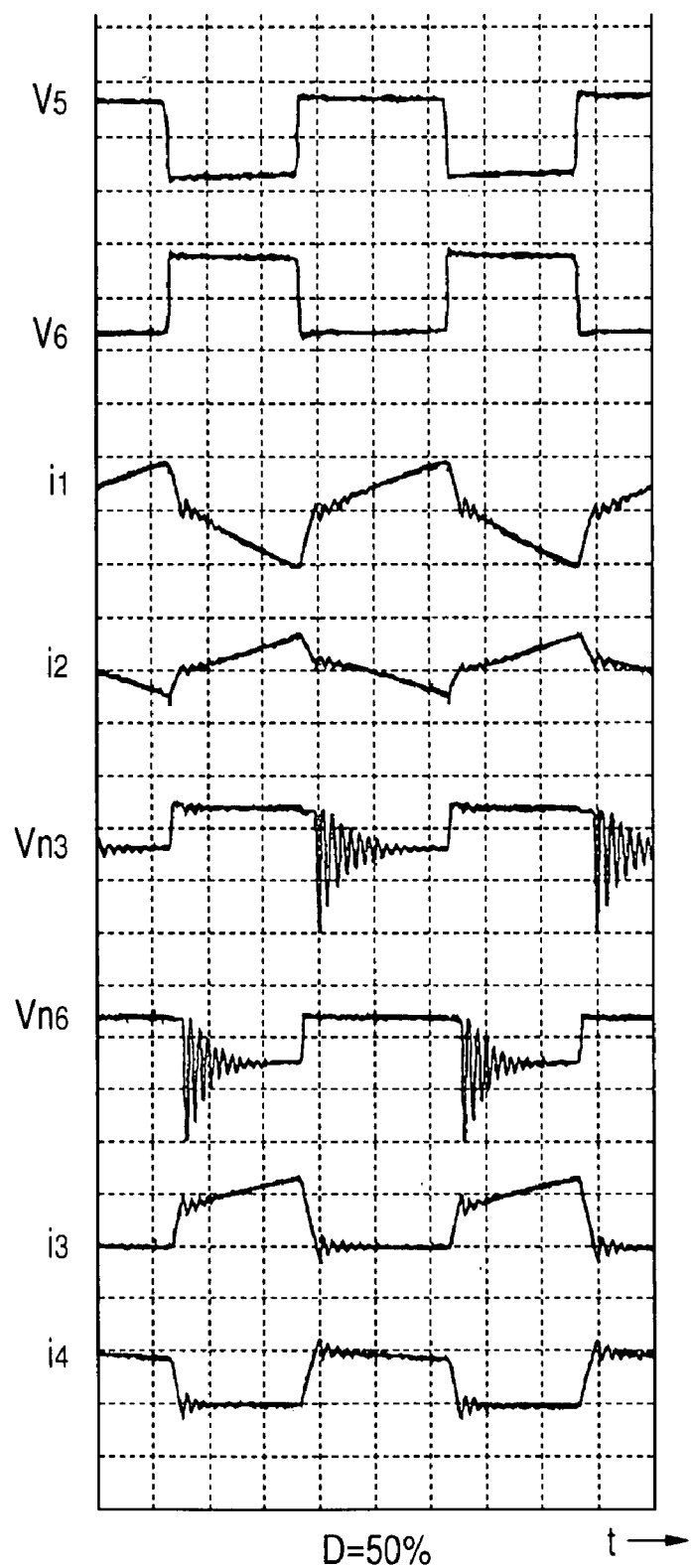
FIG. 13 is a timing diagram showing measured examples of voltage and current waveforms respectively appearing at a second set of locations in the embodiment, for the case of operation with a duty ratio D of 50%.

FIGS. 11 to 19 show measured examples of voltage and current waveforms which appear at various points within the DC-to-DC converter. Time is plotted along the horizontal axis of each diagram, while there are respectively different ranges along the vertical axis for the various waveforms. FIGS. 11 to 13 show waveforms for the case in which the duty ratio D of switching performed by the switching element Q1 is 50%, while FIGS. 14 to 16 similarly show the waveforms for the case in which D is 40%, and FIGS. 17 to 19 similarly show the waveforms for the case in which D is 30%.

Figure 14:
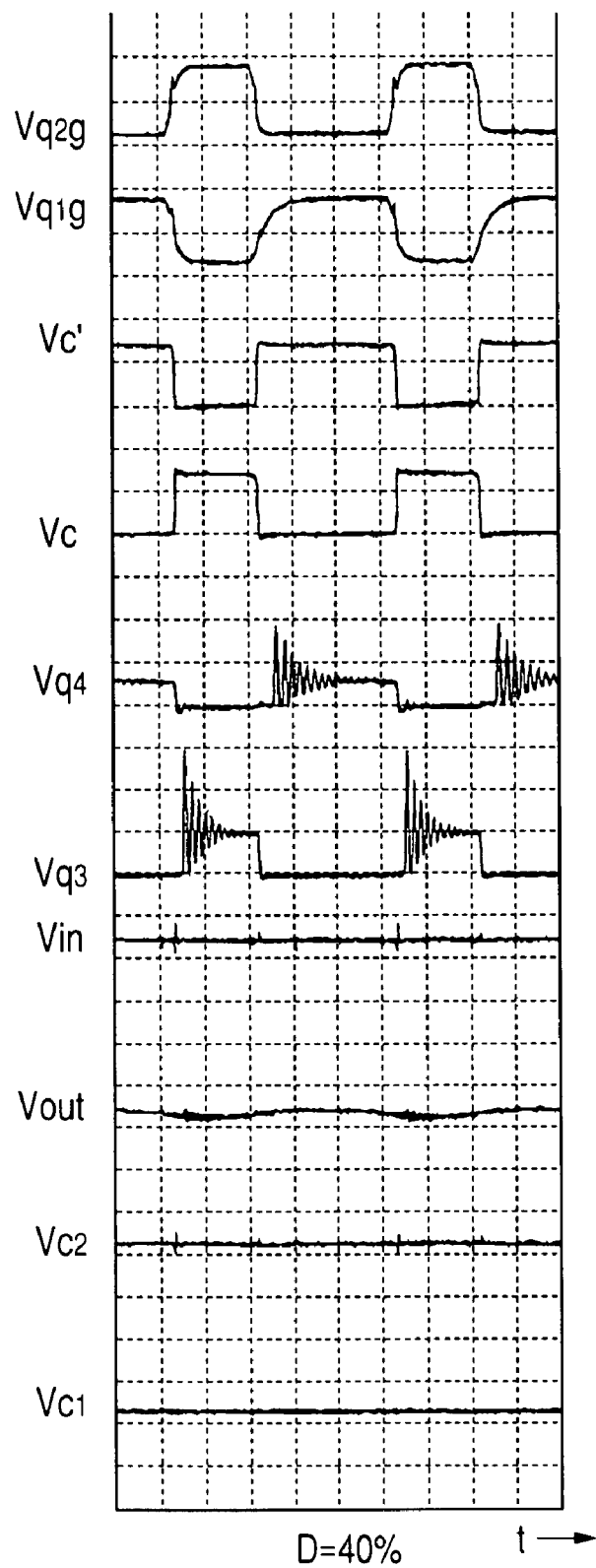
FIG. 14 is a timing diagram showing measured examples of voltage waveforms at respective locations in the embodiment, for the case of operation with a duty ratio D of 40%.
Figure 15:
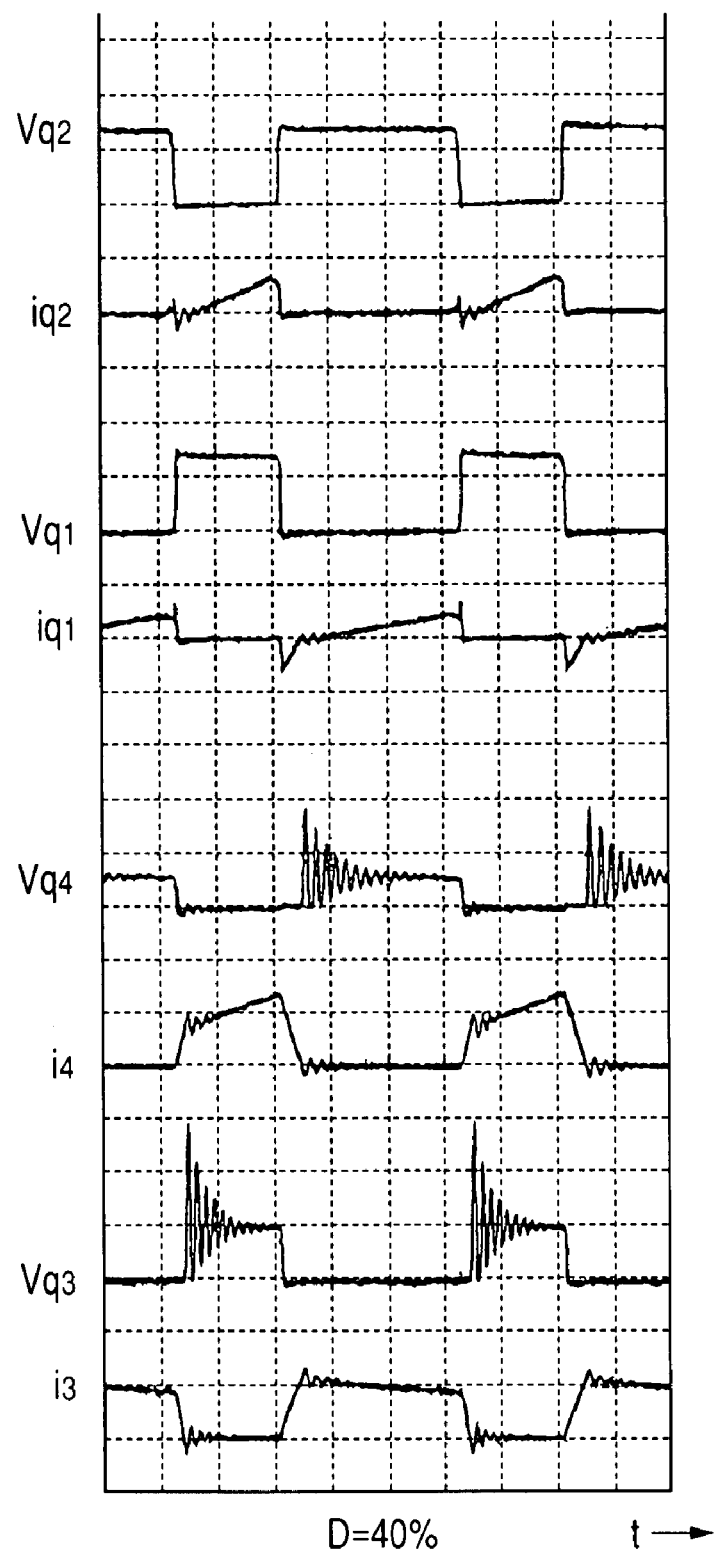
FIG. 15 is a timing diagram showing measured examples of voltage and current waveforms respectively appearing at a first set of locations in the embodiment, for the case of operation with a duty ratio D of 40%.
Figure 16:
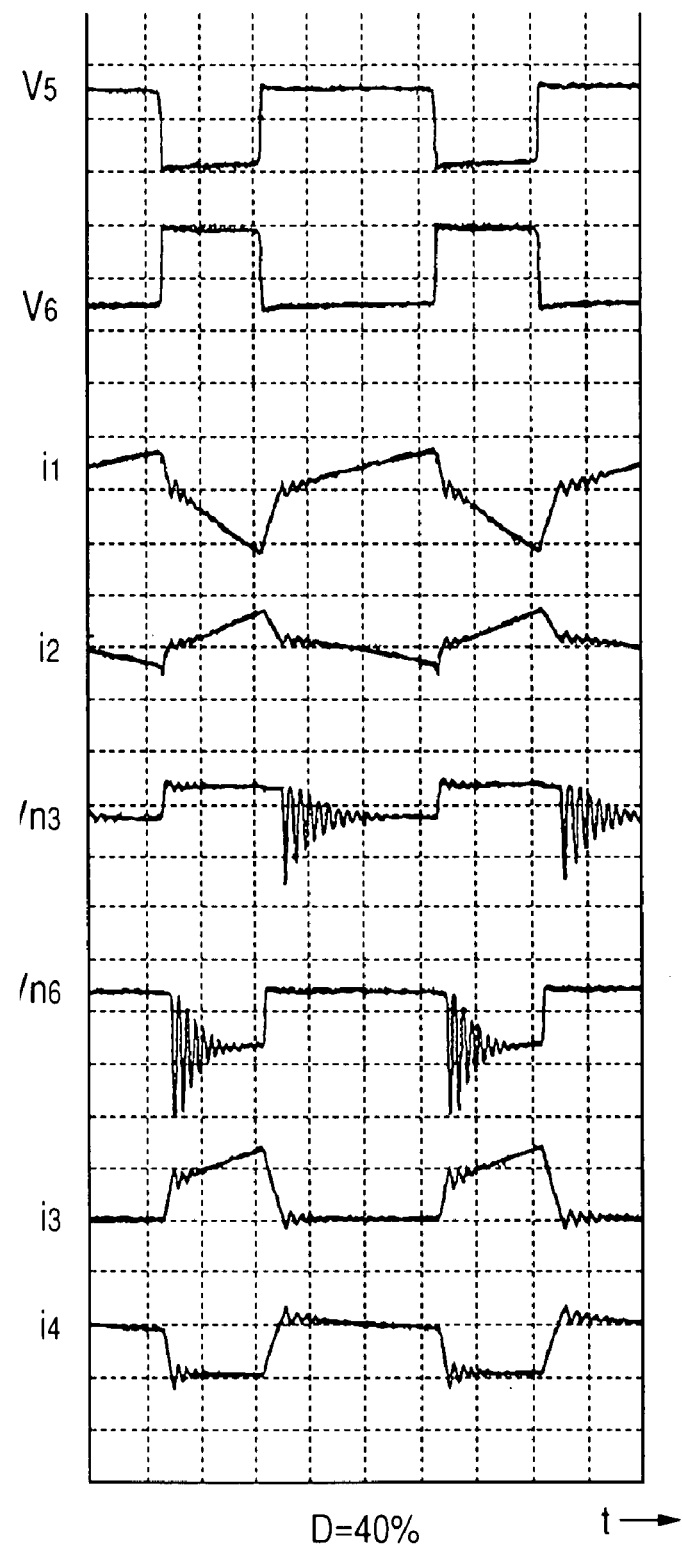
FIG. 16 is a timing diagram showing measured examples of voltage and current waveforms respectively appearing at a second set of locations in the embodiment, for the case of operation with a duty ratio D of 40%.
Figure 17:
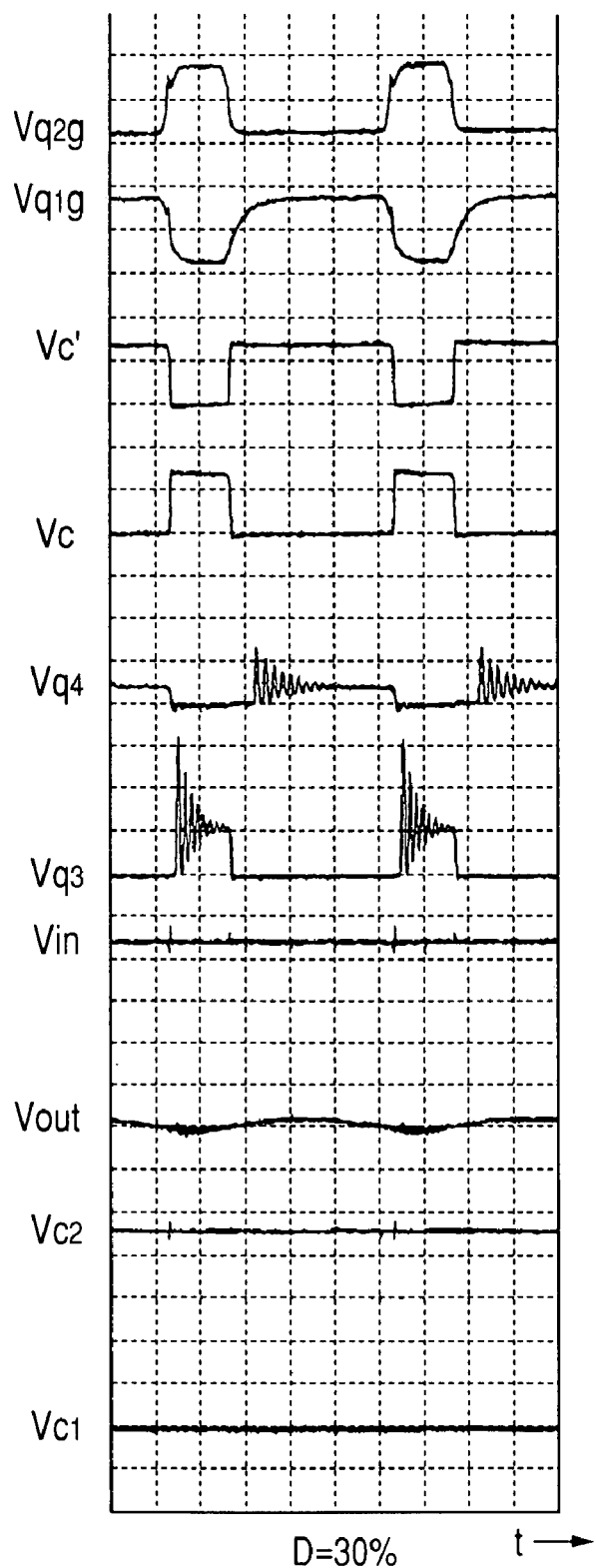
FIG. 17 is a timing diagram showing measured examples of voltage waveforms appearing at respective locations in the embodiment, for the case of operation with a duty ratio D of 30%.
Figure 18:
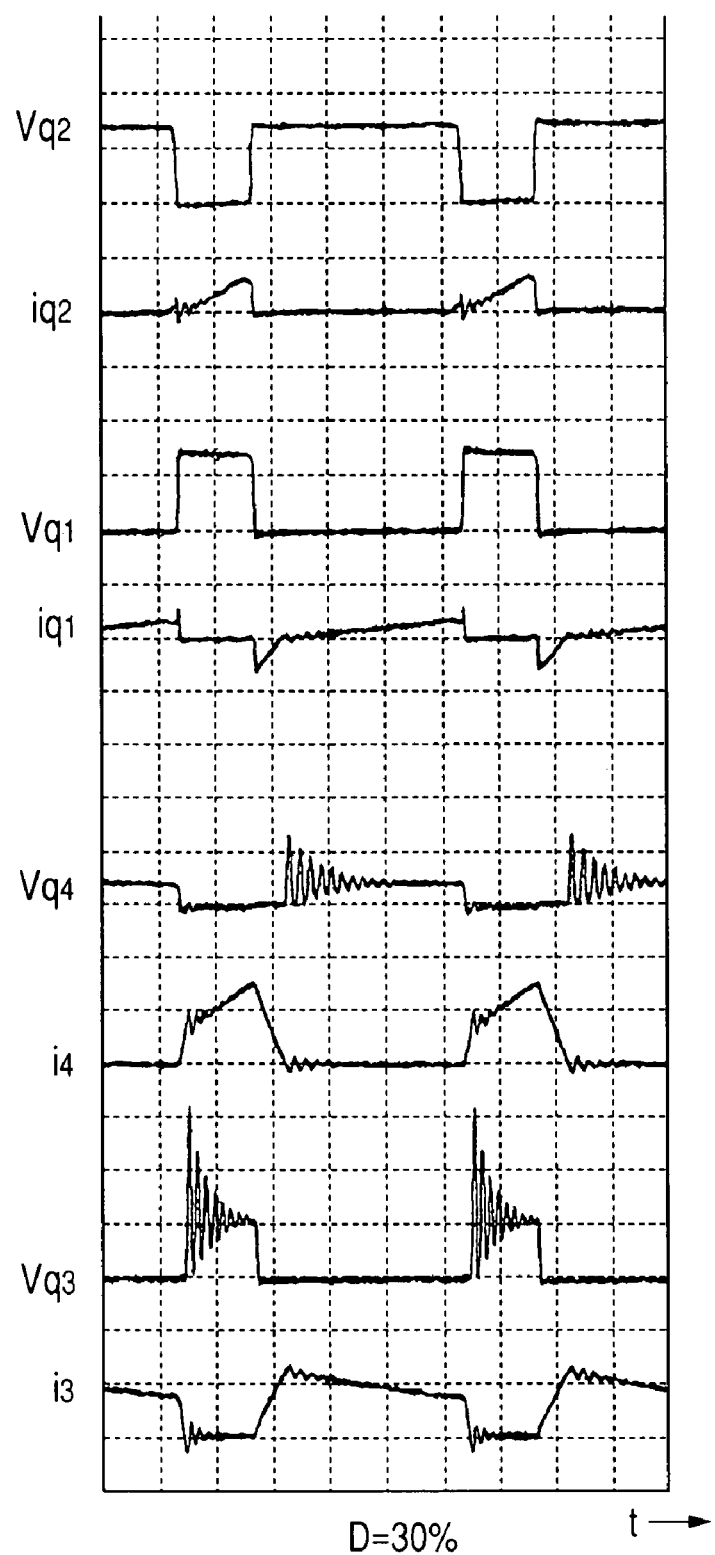
FIG. 18 is a timing diagram showing measured examples of voltage and current waveforms respectively appearing at a first set of locations in the embodiment, for the case of operation with a duty ratio D of 30%.
Figure 19:
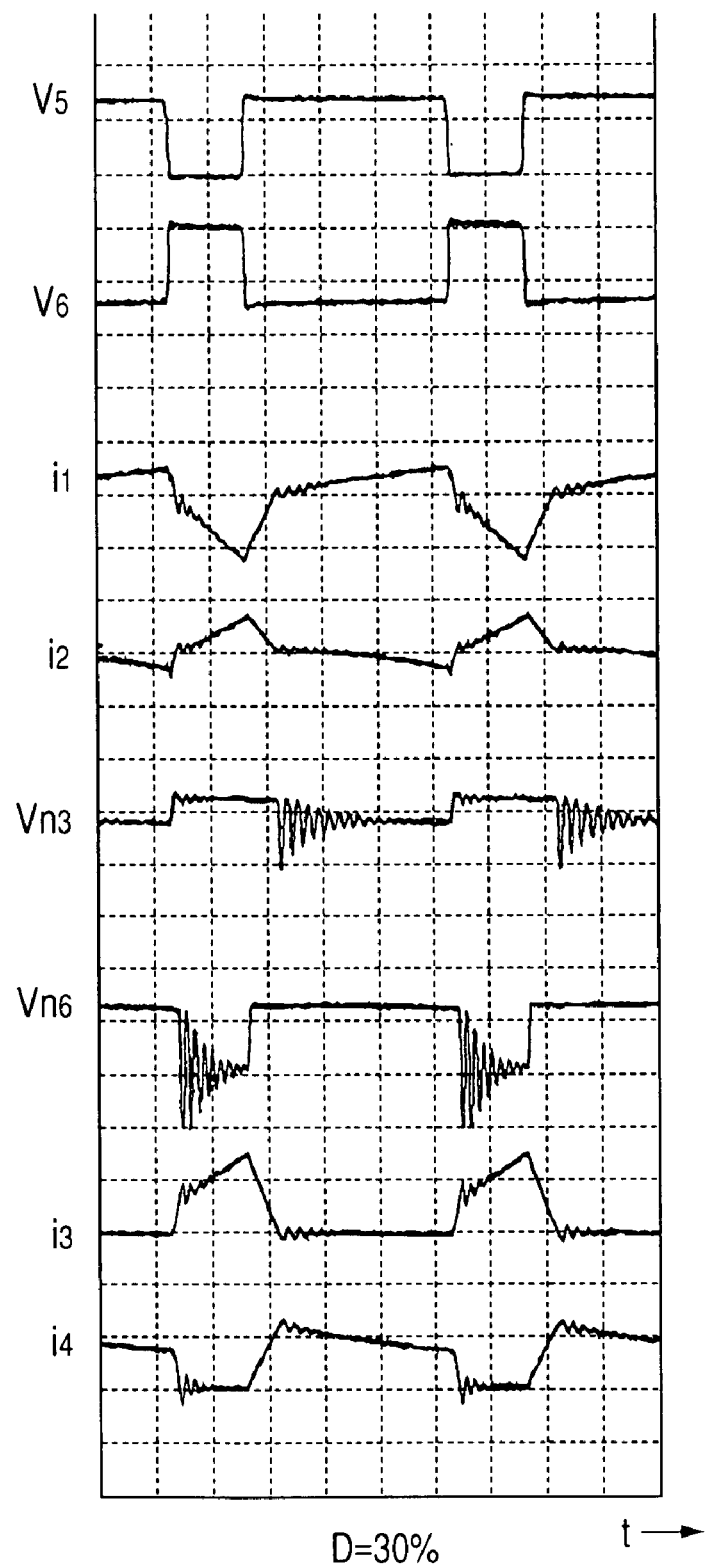
FIG. 19 is a timing diagram showing measured examples of voltage and current waveforms respectively appearing at a second set of locations in the embodiment, for the case of operation with a duty ratio D of 30%.

In FIGS. 11, 14 and 17, Vq1g designates the gate voltage (i.e., control voltage applied to the gate electrode) of the switching element Q1, and Vq2g designates the gate voltage of the switching element Q2. Vq1 is the terminal voltage, i.e., appearing between the two main (source, drain) terminals of the switching element Q1, and is equal to Vc, while Vq2 is the terminal voltage of the switching element Q2, and is equal to Vc' (i.e., 1−Vc). Vq3 is the terminal voltage of the switching element Q3, and Vq4 is the terminal voltage of the switching element Q4. Vc1 is the voltage appearing across the capacitor C1, while Vc2 is the voltage of the capacitor C2. In FIGS. 12, 15 and 18, iq2 designates the current flowing through the switching element Q2, iq1 is the current flowing through the switching element Q1. In FIGS. 13, 16 and 19, V5 denotes the voltage appearing across the series-connected pair of windings N1 and N4, V6 denotes the voltage appearing across the series-connected pair of windings N2 and N5, i1 denotes the level of current flow through the capacitor C2, i2 denotes the current through the capacitor C1, Vn3 denotes the voltage appearing across the winding N3, and Vn6 denotes the voltage appearing across the winding N6. i3 denotes the current that flows through the switching element Q4 and the winding N3, and i4 denotes the current that flows through the switching element Q3 and the winding N6.

Figure 20:
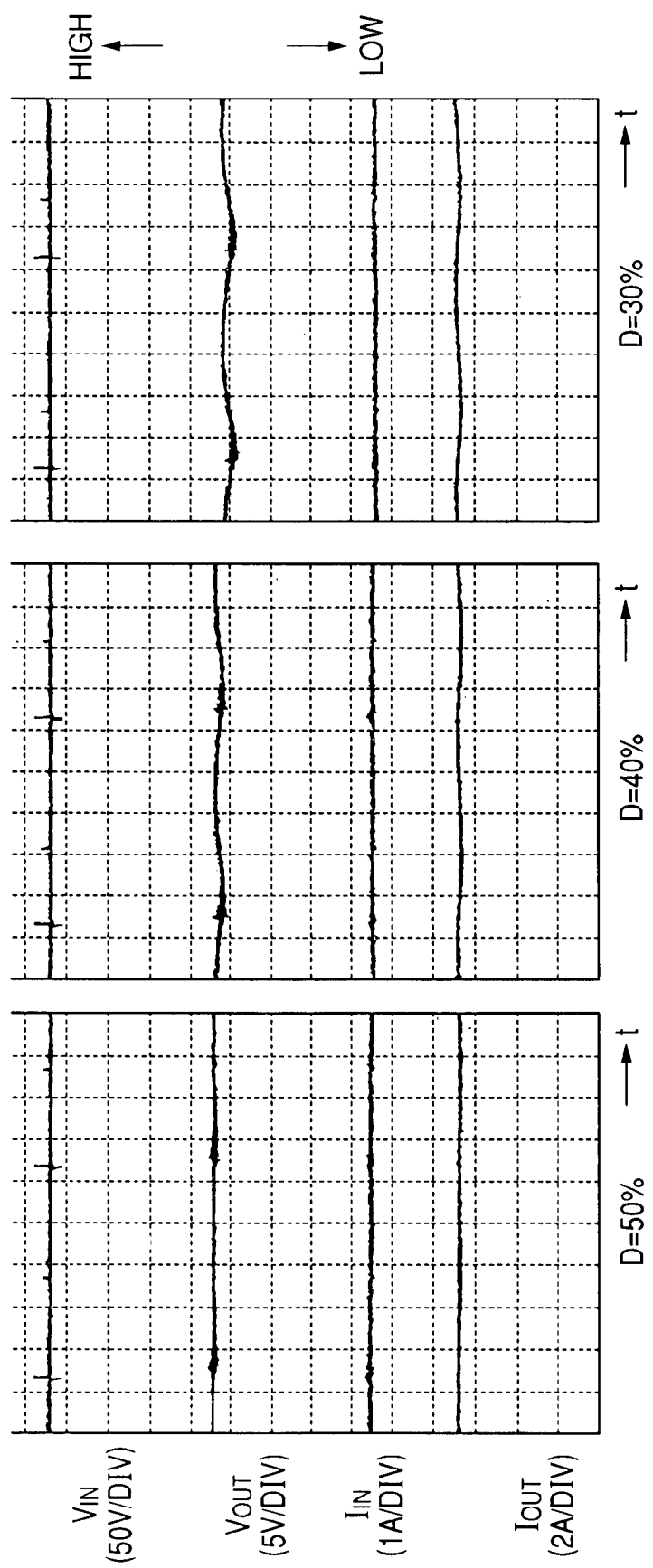
FIG. 20 shows measured examples of respective waveforms of input voltage and output voltage of the embodiment, corresponding to three different values of the duty ratio D.

FIG. 20 shows examples of the waveforms of the input voltage Vin and output voltage Vout, for the cases of the duty ratio D being 50%, 40% and 30% respectively. As shown in FIG. 20, when the duty ratio D is reduced from 50%, the amplitude of ripple appearing in the output voltage Vout becomes increased, and the amplitude of ripple in the output current iout increases correspondingly.

Also (although not clearly demonstrated by FIG. 20), as the duty ratio D is reduced from 50%, the output voltage Vout becomes lowered.

Figure 21:
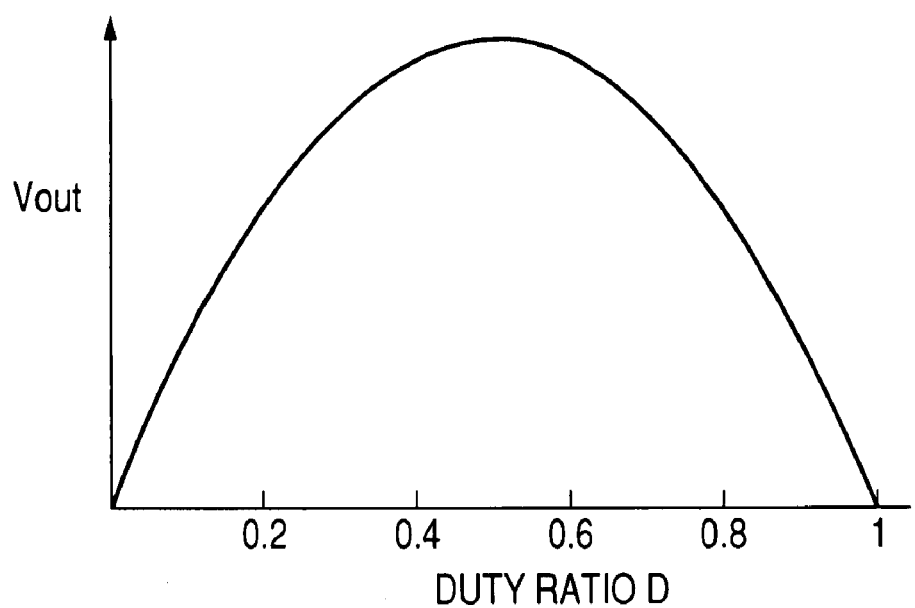
FIG. 21 is a graph illustrating a relationship between an output voltage of the embodiment and values of the duty ratio D.
Figure 22:
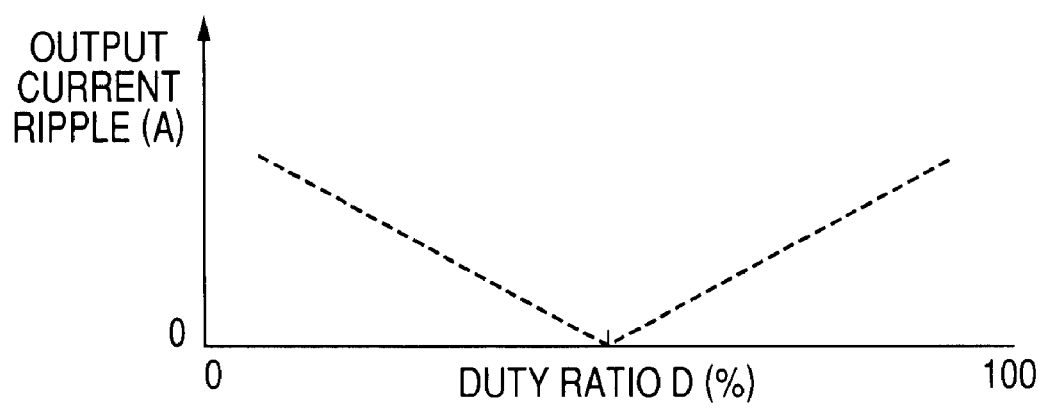
FIG. 22 is a graph illustrating a relationship between an amount of ripple in an output current of the embodiment and values of the duty ratio D.

FIG. 21 shows the relationship between the duty ratio D and the output voltage Vout, while FIG. 22 shows the relationship between the duty ratio D and the amplitude of ripple appearing in the output current iout. As shown, when the duty ratio D is 0% or 100%, the output voltage Vout becomes zero, while the output voltage Vout becomes a maximum when the impedances of respective circuit elements in the AC/DC conversion circuit 21 are equal and the duty ratio D is 50%.

Hence as shown in FIG. 1 and described hereinabove, feedback control of the level of output voltage Vout of the converter can be performed by adjusting the value of the duty ratio D in accordance with any deviation of that output voltage from a predetermined target value, to maintain the output voltage Vout at the target value.

Alternatively, it would be possible to configure the control section 3 to enable a user to adjust the value of the duty ratio D, in order to set the output voltage Vout at a desired value.

Furthermore as shown in FIG. 22, the amount of ripple in the output current iout becomes zero when the duty ratio D attains a certain value, so that it becomes possible to adjust the value of D such as to reduce the amount of ripple to a required extent.

In addition, it has been found from other experimental results that when the circuit is operated with the value of duty ratio D lower than 50%, greater stability of operation of the circuit is achieved (i.e., with reduced danger of oscillation) by comparison with operation when D is made greater than 50%.

It should be noted that the switching element Q2 can be turned to the ON state at any arbitrary time point within the above-described current transition interval from t2 to t3.

Effects Obtained

The following effects are obtained with the above embodiment of a DC-to-DC converter.

Firstly, the operation of the AC/DC conversion circuit 21 alternates between a power transfer mode in which the switching element Q1 is ON (so that power is transferred from the high-voltage power source 4 via the capacitor C2) and a mode in which the switching element Q2 is ON (so that power is transferred from the high-voltage power source 4 via the capacitor C1). Hence if the impedances of respective circuit elements in the AC/DC conversion circuit 21 are made equal, the amount of ripple in the input current from the high-voltage power source 4 can be reduced. Specifically, the windings N1, N2, N4, N5 are preferably made to have equal numbers of turns, the capacitors C2, C2 should have respectively identical values of capacitance, and the windings N3, N6 preferably have equal numbers of turns.

Since outputting is performed by the switching elements Q3 and Q4 in alternation, the amount of ripple in the output current iout is further reduced.

Hence with this DC-to-DC converter, due to the fact that the transformer pair T1, T2 operate in alternation to produce an output current iout which is substantially a DC current (i.e., having only a small amount of ripple), it is only necessary to use a single smoothing capacitor to eliminate ripple in the output current from the converter. Thus, incorporation of a smoothing choke coil becomes unnecessary, so that the converter can be made compact and light in weight.

Furthermore, each time the switching element Q1 is turned OFF, the common terminal Tec becomes connected to the positive-polarity terminal of the high-voltage power source 4 via the diode (parasitic diode D2) that is in parallel with the switching element Q2, so that primary-side current of the transformer pair T1, T2 flows through that diode, and the voltage Vc across the switching element Q1 is thereby clamped at the input voltage Vin of the high-voltage power source 4. Hence, it is only necessary for the switching element Q1 to have a relatively low value of breakdown voltage, so that an inexpensive device can be utilized. For similar reasons, the same advantage is obtained for the switching element Q2.

Furthermore with the above embodiment, storing of energy in the capacitors C1, C2 serves to reduce the rate of increase of current through the switching elements Q1 and Q2 during switching of these elements, thereby increasing efficiency. Moreover due to the reduction of the rate of increase of current, the amount of heat generated in the switching elements Q1 and Q2 is reduced, and this also enables devices having a high cut-off frequency to be used as the switching elements Q1 and Q2. The improved efficiency enables the apparatus used for cooling the conversion to be simplified, so that the overall apparatus size can be mode more compact and light in weight. Moreover the switching elements Q1 and Q2 and the capacitors C1, C2 can be made smaller and more light in weight, further enabling the overall apparatus to be made more compact.

More specifically, with the above embodiment, switching off of the switching element Q1 or Q2 is performed at time points synchronized with time points at which the level of current flowing through the switching element (to charge the corresponding one of the capacitors C1 or C2) is low, thereby achieving increased efficiency. Furthermore since the level of reverse current that flows from the transformer pair T1, T2 back to the high-voltage power source 4 is small, the input-side smoothing capacitor C3 need only have a small value of capacitance.

Moreover since the levels of voltage developed within the AC/DC conversion circuit 21 can be made lower than is possible with prior art types of DC-to-DC converter (such as those of the prior art reference documents described above), the breakdown voltage level required for each of the capacitors C1, C2 can be reduced, thereby further enabling the overall apparatus size to be made more compact and light in weight.

Various modifications to the above embodiment can be envisaged, for example as follows.

Modification 1

The embodiment can be modified to make the duty ratio D change only gradually, after the apparatus is switched on. This will serve to prevent an excessive level of surge current flow into the smoothing capacitors.

Modification 2

The embodiment has been described for the case of performing voltage step-down DC-to-DC conversion. However the embodiment could be modified to perform voltage step-up, by appropriately changing the ratio of numbers of turns of the primary and secondary windings of the transformer pair T1, T2.

Modification 3

The embodiment has been described for the case of the switching elements Q3 and Q4 performing synchronous rectification, by performing complementary on/off switching that is synchronized with the complementary on/off switching of the switching elements Q1, Q2. However if only unidirectional DC-to-DC conversion from the high-voltage power source 4 to the low-voltage power source 5 is to be performed, one or both of the switching elements Q3 and Q4 could be replaced by rectifier diodes.

Modification 4

When the converter is being used to transfer DC power between two DC power sources, as shown in FIG. 1, the control section 3 could be configured to enable a user to adjust the duty ratio D for the purpose of changing the direction of DC power transfer. That is to say, if power is being transferred from the high-voltage power source 4 to the low-voltage power source 5, then if the value of the duty ratio D is adjusted to make the output voltage Vout become lower than an output voltage produced by the low-voltage power source 5, then DC power will begin to be transferred in the reverse direction, from the low-voltage power source 5 to the high-voltage power source 4.

Modification 5

Instead of utilizing separate cores for the transformer pair T1, T2, these could be wound on a common core, to have a common magnetic circuit.

Modification 6

It would be possible to perform each switch-on of the switching element Q3 at a time point which precedes switch-on of the switching element Q1 by a first predetermined time interval, and similarly to perform each switch-on of the switching element Q4 at a point which precedes switch-on of the switching element Q2 by a second predetermined time interval.

Modification 7

It would be possible to modify the embodiment to omit the dead-time intervals between operations of the switching elements Q1 and Q2 (described above referring to FIG. 4), and to similarly omit the dead-time intervals between operations of the switching elements Q1 and Q2.

Furthermore it would be possible to modify the embodiment such that each ON interval of one of the switching elements Q1 and Q2 overlaps the succeeding ON interval of the other one, and such that each ON interval of one of the switching elements Q3 and Q4 overlaps the succeeding ON interval of the other.

Moreover it is not essential that the duration of each ON interval of the switching element Q1 be identical to each ON interval of the switching element Q3, since some amount of difference between these is allowable. Similarly, some deviation between the durations of the ON intervals of the switching element Q2 and those of the switching element Q4 would be allowable.

What is claimed is:

1. A two-transformer type of DC-to-DC converter comprising
    a first transformer having a first winding, a second winding and a third winding, and a second transformer having a fourth winding, a fifth winding and a sixth winding, with respective first ends of said first and fourth windings connected to form a first winding pair, respective first ends of said second and fifth windings connected to form a second winding pair, and respective second ends of said fourth and fifth windings connected together,
    a first DC terminal and second DC terminal for connecting said DC-to-DC converter to a first external circuit, and a third DC terminal and fourth DC terminal for connecting said DC-to-DC converter to a second external circuit,
    a first AC/DC conversion circuit connected between said first and second DC terminals and said first, second, fourth and fifth windings, for performing conversion between DC electrical power and AC electrical power,
    a second AC/DC conversion circuit connected between said third and fourth DC terminals and said second and third windings, for performing conversion between DC electrical power and AC electrical power, and
    a control circuit adapted to control said conversion operations of said first A/D converter and said second AC/DC conversion circuit;
    wherein said first AC/DC conversion circuit comprises:
    a first switching element controlled to periodically switch between closed and opened states for respectively connecting and disconnecting said first DC terminal to/from a junction of said second ends of the fourth and fifth windings,
    a second switching element controlled to periodically switch between said opened and closed states for respectively connecting and disconnecting said second DC terminal to/from said junction,
    a first capacitor connected between said first DC terminal and a second end of said second winding, and
    a second capacitor connected between said second DC terminal and a second end of said first winding.

2. A DC-to-DC converter as claimed in claim 1, comprising a diode connected in parallel with said first switching element.

3. A DC-to-DC converter as claimed in claim 1, comprising a diode connected in parallel with said second switching element.

4. A DC-to-DC converter as claimed in claim 1, wherein a DC voltage appearing between said first DC terminal and second DC terminal is higher than a DC voltage appearing between said third DC terminal and fourth DC terminal.

5. A DC-to-DC converter as claimed in claim 1, wherein a DC voltage appearing between said first DC terminal and second DC terminal is lower than a DC voltage appearing between said third DC terminal and fourth DC terminal.

6. A DC-to-DC converter as claimed in claim 1, wherein
    said first AC/DC conversion circuit is adapted to operate as a power inverter circuit for converting DC electrical power applied between said first DC terminal and second DC terminal to AC electrical power,
    said AC electrical power is transferred to said second AC/DC conversion circuit via said first transformer and second transformer, and
    said second AC/DC conversion circuit is adapted to operate as a rectifier circuit for converting said AC electrical power to DC electrical power, to be outputted from said third DC terminal and fourth DC terminal.

7. A DC-to-DC converter as claimed in claim 1, wherein
    said second AC/DC converter is adapted to operate as a power inverter circuit for converting DC electrical power applied between said third DC terminal and fourth DC terminal to AC electrical power,
    said AC electrical power is transferred to said first AC/DC conversion circuit via said first transformer and second transformer, and
    said first AC/DC conversion circuit is adapted to operate as a rectifier circuit for converting said AC electrical power to DC electrical power, to be outputted from said first DC terminal and second DC terminal.

8. A DC-to-DC converter as claimed in claim 1, wherein said control circuit is adapted to alternately set said first switching element in said closed and opened states with a specific duty ratio, and wherein designating said predetermined duty ratio as D, said control circuit is adapted to alternately set said second switching element in said closed and opened states with a duty ratio (1−D).

9. A DC-to-DC converter as claimed in claim 1, wherein said control circuit is adapted to control said first switching element and said second switching element for complementary opened/closed switching operation, and to establish a dead-time interval of predetermined duration in which both of said first switching element and second switching element are in said opened state, following each interval in which one of said first and second switching elements is in said closed state.

10. A DC-to-DC converter as claimed in claim 2, wherein said first switching element is a semiconductor device and said diode is a parasitic diode which is intrinsic to said semiconductor device.

11. A DC-to-DC converter as claimed in claim 3, wherein said second switching element is a semiconductor device and said diode is a parasitic diode which is intrinsic to said semiconductor device.

12. A DC-to-DC converter as claimed in claim 6, wherein said second AC/DC conversion circuit comprises a smoothing circuit for smoothing said outputted DC electrical power and wherein said smoothing circuit in its entirety comprises a single capacitor.

13. A DC-to-DC converter as claimed in claim 6, wherein said third switching element is controlled to enter said opened and closed states in synchronism with said first switching element and said fourth switching element is controlled to enter said opened and closed states in synchronism with said second switching element, for thereby implementing synchronous rectification operation by said second AC/DC conversion circuit.

14. A DC-to-DC converter as claimed in claim 8, wherein said control circuit is adapted to set said duty ratio D at a value within a range of duty ratios whereby an amount of ripple in at least one of an output DC current and an output DC voltage produced by said DC-to-DC converter is below a predetermined value.

15. A DC-to-DC converter as claimed in claim 8, wherein said control circuit is adapted to set said duty ratio D at a value no greater than 50%.

16. A DC-to-DC converter as claimed in claim 8, wherein said control circuit is adapted to set said duty ratio D at a value greater than 50%.

17. A DC-to-DC converter as claimed in claim 8, wherein said control circuit is adapted to be operable for varying said duty ratio D to correspondingly vary a level of electrical power that is transferred by said DC-to-DC converter between said first external circuit and said second external circuit.

18. A two-transformer type of DC-to-DC converter comprising a power conversion circuit for converting input DC electrical power from a DC power source into AC electrical power, a rectifier circuit, and a first transformer and a second transformer each comprising two primary windings respectively connected to said power conversion circuit and each comprising a secondary winding connected to said rectifier circuit, with said power conversion circuit comprising a first input supply terminal and a second input supply terminal connected between a positive potential and a negative potential of said DC power source;

wherein:
a first primary winding and second primary winding of said first transformer are connected together at respective first ends thereof, a second end of said first primary winding of the first transformer is connected to a first end of a first primary winding of said second transformer and a second end of said second primary winding of the first transformer is connected to a first end of a second primary winding of said second transformer, and said power conversion circuit comprises a first capacitor connected between said first input supply terminal and a second end of said first primary winding of said second transformer, and a second capacitor connected between said second input supply terminal and a second end of said second primary winding of said second transformer, a first switching element connected between said first input supply terminal and a common connection of said first ends of said primary windings of first transformer, a second switching element connected between said second input supply terminal and said common connection, and a control circuit adapted to control said first switching element and said second switching element for performing complementary opened/closed switching operation.

19. A DC-to-DC converter as claimed in claim 18, comprising a first diode connected in parallel with said first switching element, for conducting a reverse-direction flow of current when said first switching element becomes closed, and a second diode connected in parallel with said second switching element, for conducting a reverse-direction flow of current when said second switching element becomes closed.

20. A DC-to-DC converter as claimed in claim 18, wherein said rectifier circuit comprises a third switching element and a fourth switching element respectively coupled to said secondary winding of said first transformer and said secondary winding of said second transformer, and wherein said control circuit is adapted to control said third switching element and fourth switching element to perform complementary opened/closed switching operations in synchronism with said complementary witching operations of said first switching element and second switching element, for effecting synchronous rectification of said AC electrical power.

21. A DC-to-DC converter as claimed in claim 19, wherein said first switching element and second switching element are respective semiconductor devices and wherein said first diode and second diode are respective parasitic diodes that are intrinsic to said semiconductor devices.

* * * * *